(12) United States Patent
Hamilton

(10) Patent No.: US 11,512,915 B2
(45) Date of Patent: Nov. 29, 2022

(54) GUN LOCK

(71) Applicant: Rob Hamilton, Plainview, TX (US)

(72) Inventor: Rob Hamilton, Plainview, TX (US)

(*) Notice: Subject to any disclaimer, the term of this patent is extended or adjusted under 35 U.S.C. 154(b) by 41 days.

(21) Appl. No.: 17/366,989

(22) Filed: Jul. 2, 2021

(65) Prior Publication Data

US 2022/0178637 A1 Jun. 9, 2022

Related U.S. Application Data

(60) Provisional application No. 63/121,420, filed on Dec. 4, 2020.

(51) Int. Cl.
*F41A 17/04* (2006.01)

(52) U.S. Cl.
CPC .................................. *F41A 17/04* (2013.01)

(58) Field of Classification Search
CPC .......... F41A 17/04; F41A 17/00; F41A 17/02; F41A 23/26; B60R 7/14
USPC ........................................................ 42/70.11
See application file for complete search history.

(56) References Cited

U.S. PATENT DOCUMENTS

| | | | | |
|---|---|---|---|---|
| 3,802,612 | A * | 4/1974 | Smith | B60R 7/14 211/8 |
| 6,279,799 | B1 * | 8/2001 | Horton | B60R 7/14 224/572 |
| 6,619,082 | B1 * | 9/2003 | Bentley | A47B 81/005 70/58 |
| 9,284,053 | B2 * | 3/2016 | Cook | F41A 23/18 |
| 9,677,835 | B1 * | 6/2017 | Binns | F41A 17/54 |
| 2016/0355139 | A1 * | 12/2016 | Noonan | B60R 7/04 |
| 2019/0049215 | A1 * | 2/2019 | Talbot | F41C 33/046 |

* cited by examiner

*Primary Examiner* — John Cooper
(74) *Attorney, Agent, or Firm* — Shannon Warren

(57) ABSTRACT

A gun lock system for securing a portion of a firearm for safety and theft-deterence. wherein: the gun lock system comprises a tongue, a lock shell, and a release assembly. The lock shell comprises a width, a height, a depth, a front side, a back side, a top side, a first side, a second side and a bottom end. The lock shell further comprises a tongue slot configured to selectively receive a portion of the tongue. The tongue comprises a tongue width and a tongue depth. The tongue slot comprises a slot width and a slot depth. The tongue comprises a first end and a second end.

20 Claims, 20 Drawing Sheets

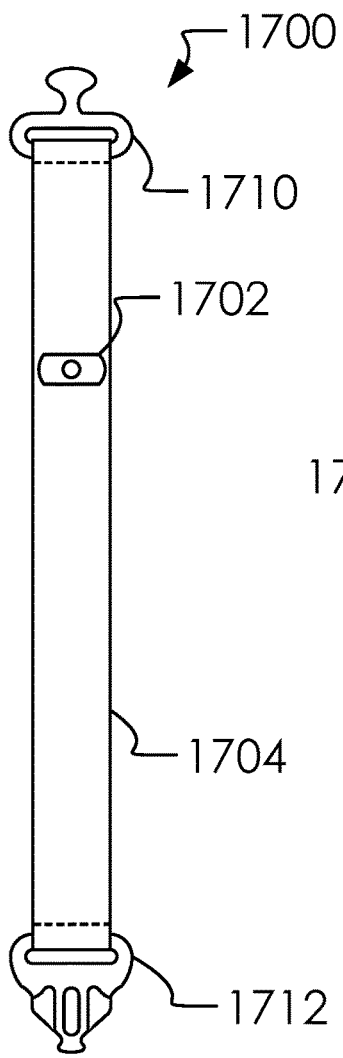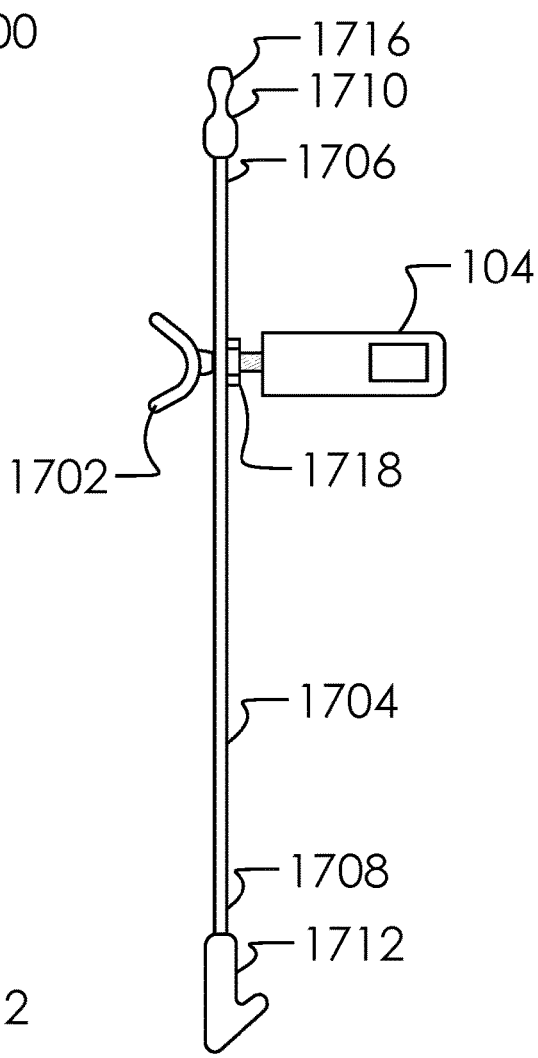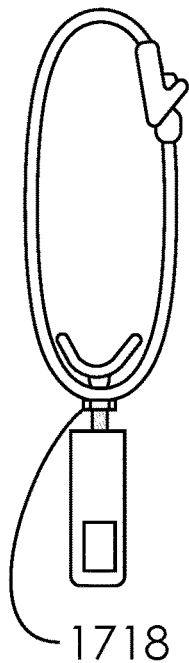
FIG. 17A   FIG. 17B   FIG. 17C
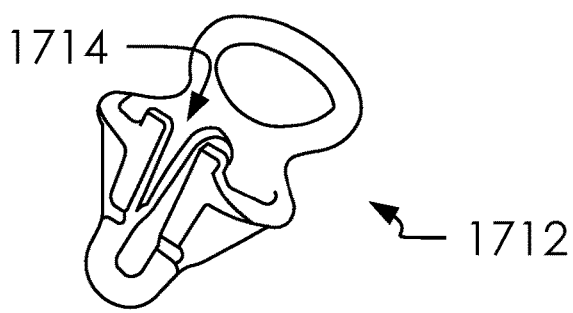
FIG. 17D

GUN LOCK

CROSS-REFERENCE TO RELATED APPLICATIONS

This application claims benefit to U.S. Patent Application No. 63/121,420 filed on 2020 Dec. 4.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Although none of the prior art known the Applicant is seen to anticipate the current system, examples of the prior art comprise: US20110248489A1, US20060243844A1, U.S. Pat. Nos. 4,790,597A, 8,818,643B2, 7,837,566B2, 8,286,998B2, 6,959,947B2, 7,000,488B2, 7,007,976B2, 7,584,997B2, US20170059265A1, U.S. Pat. Nos. 10,873,837B2, 10,034,066B2, 10,529,221B2, 10,301,851B1, US20180043856A1, US20180043857A1, US20200247351A1, U.S. Pat. Nos. 6,467,675B1, 8,612,099B2, US20090096200A1, U.S. Pat. No. 10,315,704B2, US20150210389A1, US20180244318A1, U.S. Pat. Nos. 6,448,907B1, 10,152,876B2, 7,411,204B2, 7,397,363B2, 7,056,179B2, 7,259,357B2, 7,855,624B2, 8,776,262B2, US20170072316A1, US20150054639A1, US20160140404A1, US20190102840A1, U.S. Pat. No. 10,621,589B2, 8,740,305B2, 10,346,925B2, US20180075380A1, and U.S. Pat. No. 5,657,652.

BRIEF SUMMARY OF THE INVENTION

A gun lock system for securing a portion of a firearm for safety and theft-deterence. wherein: said gun lock system comprises a tongue, a lock shell, and a release assembly. Said lock shell comprises a width, a height, a depth, a front side, a back side, a top side, a first side, a second side and a bottom end. Said lock shell further comprises a tongue slot configured to selectively receive a portion of said tongue. Said tongue comprises a tongue width and a tongue depth. Said tongue slot comprises a slot width and a slot depth. Said tongue comprises a first end and a second end. Said first end of said tongue is configured to selectively mate with a buckle receiver. Said bottom end of said lock shell comprises a bottom opening exposing a cavity within said lock shell. Said buckle receiver comprises a tongue receiver slot, a release button and a head portion. Said lock shell is configured to receive a portion of said head portion of said buckle receiver. with a portion of said head portion inside of said lock shell, said tongue slot of said lock shell is aligned with a portion of said tongue receiver slot of said buckle receiver. Said slot width and said slot depth are larger than said tongue width and said tongue depth to allow a portion of said first end to pass into a portion of said lock shell. Said release assembly is configured to selectively release said tongue from said buckle receiver within said lock shell. Said lock shell is configured to prevent release of said tongue from said buckle receiver without use of said release assembly. Said second end of said tongue is configured to attach to said firearm. Said lock shell 100 comprises a top surface comprising said tongue slot. Said tongue slot comprises a slot guard which comprises a raised portion of said top surface having said slot width, said slot depth, and a slot height. Said second end of said tongue is attached to said firearm with a buttstock anchor. Said gun lock system comprises said buttstock anchor. Said buttstock anchor comprises a horizontal anchor shaft. Said horizontal anchor shaft is configured to inserted through a shaft through a portion of a buttstock end, and said tongue is held within a portion of said buttstock end by said horizontal anchor shaft. Said second end of said tongue is inserted through a lower aperture in said buttstock end, extend up to said horizontal anchor shaft, and a portion of said buttstock anchor is inserted through a portion of said second end of said tongue. Said gun lock system further comprises a buttstock wrap assembly. Said second end of said tongue is attached to said firearm with said buttstock wrap assembly. Said buttstock wrap assembly comprises lower cradle, strap having a first end and a second end, a first end bracket, and a second end bracket. Said buttstock wrap assembly is configured to wrap around said buttstock end, securely extend said first end toward said second end of said buttstock wrap assembly, hold a lower portion of said buttstock end in said lower cradle, attach said first end bracket to said second end bracket, and hold said tongue to said buttstock end. Said second end bracket comprises a receiver slot, and said first end bracket comprises a receiver extension. Said receiver extension is configured to attach to said second end bracket by sliding said receiver slot into said receiver extension and applying pressure along the length of said strap to pull said receiver slot and said receiver extension away from one another.

Said gun lock system for securing a portion of said firearm for safety and theft-deterence. wherein: said gun lock system comprises said tongue, said lock shell, and said release assembly. Said lock shell comprises said width, said height, said depth, said front side, said back side, said top side, said first side, said second side and said bottom end. Said lock shell further comprises said tongue slot configured to selectively receive a portion of said tongue. Said tongue comprises said tongue width and said tongue depth. Said tongue slot comprises said slot width and said slot depth. Said tongue comprises said first end and said second end. Said first end of said tongue is configured to selectively mate with said buckle receiver. Said bottom end of said lock shell comprises said bottom opening exposing said cavity within said lock shell. Said buckle receiver comprises said tongue receiver slot, said release button and said head portion. Said lock shell is configured to receive a portion of said head portion of said buckle receiver. with a portion of said head portion inside of said lock shell, said tongue slot of said lock shell is aligned with a portion of said tongue receiver slot of said buckle receiver. Said slot width and said slot depth are larger than said tongue width and said tongue depth to allow a portion of said first end to pass into a portion of said lock shell. Said release assembly is configured to selectively release said tongue from said buckle receiver within said lock shell. Said lock shell is configured to prevent release of said tongue from said buckle receiver without use of said release assembly. Said second end of said tongue is configured to attach to said firearm.

Said gun lock system for securing a portion of said firearm for safety and theft-deterence. wherein: said gun lock system comprises said tongue, said lock shell, and said release assembly. Said lock shell comprises said width, said height, said depth, said front side, said back side, said top side, said first side, said second side and said bottom end. Said lock shell further comprises said tongue slot configured to selectively receive a portion of said tongue. Said tongue comprises said tongue width and said tongue depth. Said tongue slot comprises said slot width and said slot depth. Said tongue comprises said first end and said second end. Said first end of said tongue is configured to selectively mate with said buckle receiver. Said bottom end of said lock shell comprises said bottom opening exposing said cavity within said lock shell. Said buckle receiver comprises said tongue receiver slot, said release button and said head portion. Said lock shell is configured to receive a portion of said head portion of said buckle receiver. with a portion of said head portion inside of said lock shell, said tongue slot of said lock shell is aligned with a portion of said tongue receiver slot of said buckle receiver. Said slot width and said slot depth are larger than said tongue width and said tongue depth to allow a portion of said first end to pass into a portion of said lock shell. Said release assembly is configured to selectively release said tongue from said buckle receiver within said lock shell. Said lock shell is configured to prevent release of said tongue from said buckle receiver without use of said release assembly. Said second end of said tongue is configured to attach to said firearm. Said lock shell comprises said top surface comprising said tongue slot. Said tongue slot comprises said slot guard which comprises a raised portion of said top surface having said slot width, said slot depth, and said slot height. Said release assembly comprises a lock, a button pressing extension and an unlocking mechanism. Said lock is configured to selectively activate or deactivated said unlocking mechanism. Said unlocking mechanism is configured to engage or disengage said button pressing extension. Said button pressing extension is configured to selectively activate said release button of said buckle receiver between unlocking position and locking position.

BRIEF DESCRIPTION OF THE SEVERAL VIEWS OF THE DRAWING

FIGS. 17A, 17B, 17C, and 17D illustrate a perspective overview of a buttstock wrap assembly 1700.

FIG. 18C comprises a solid strap slide on wrap 1806.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
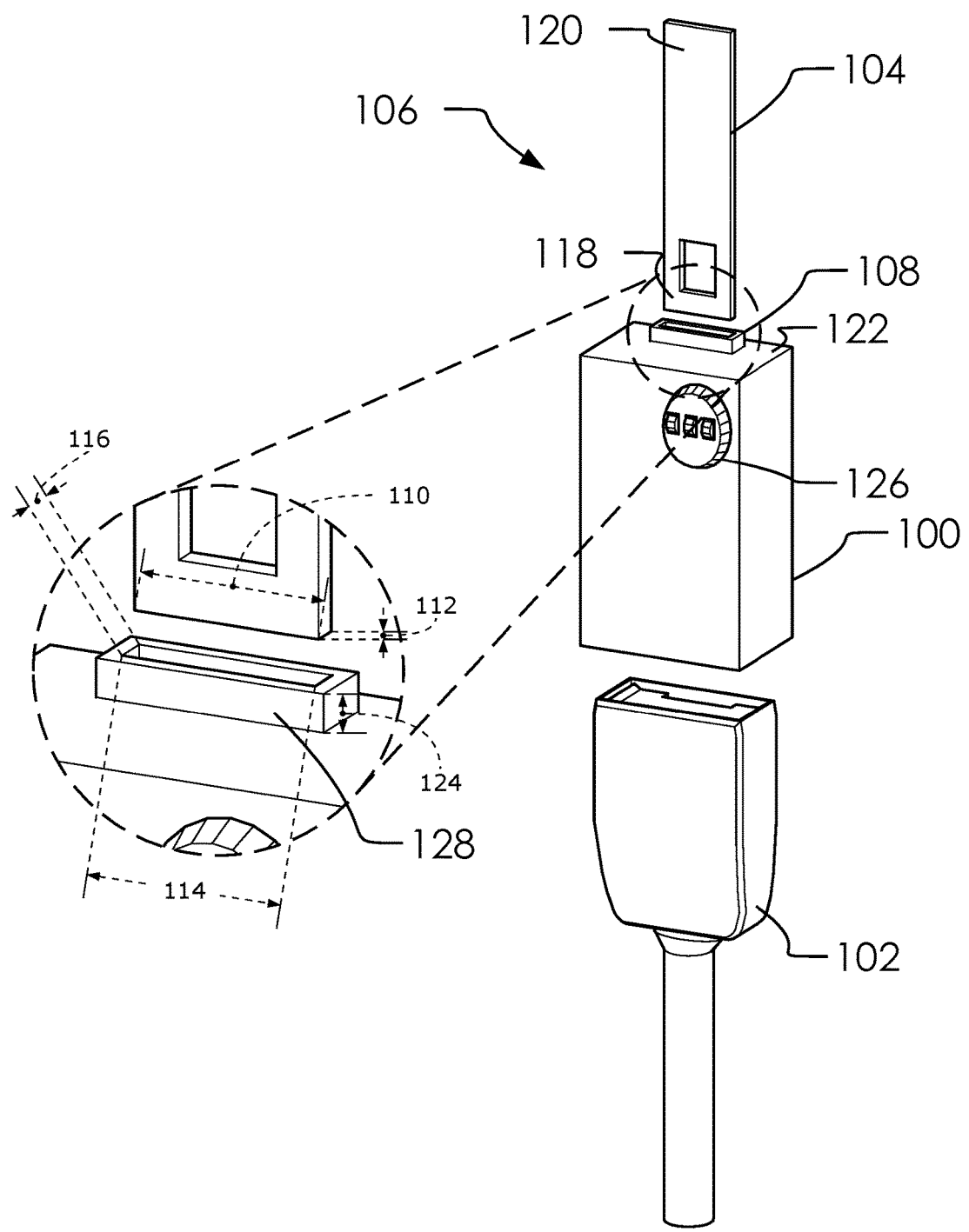
FIG. 1 illustrates an exploded perspective overview of a gun lock system 106.

FIG. 1 illustrates an exploded perspective overview of a gun lock system 106.

In one embodiment, said gun lock system 106 can comprise a lock shell 100, a buckle receiver 102 and a tongue 104.

One design goal of said gun lock system 106 can comprise to allow said tongue 104 to freely attach to said buckle receiver 102 in a conventional way, but to hinder unbuckling said tongue 104 from said buckle receiver 102.

Said lock shell 100 can comprise a top surface 122 comprising a tongue slot 108. In one embodiment, said tongue slot 108 can comprise a slot guard 128 which can comprise a raised portion of said top surface 122 having a slot width 114, a slot depth 116, and a slot height 124.

In one embodiment, said tongue 104 can comprise a second end 120 and a first end 118, as illustrated. In one embodiment, said tongue 104 at said first end 118 can comprise a tongue depth 112 and a tongue width 110. In one embodiment, said first end 118 can slide through a portion of said tongue slot 108 and into said buckle receiver 102 within a portion of said lock shell 100.

Said lock shell 100 can further comprise a release assembly 126. Said release assembly 126 can be configured to selectively release said tongue 104 from said buckle receiver 102 within said lock shell 100. Said lock shell 100 can be configured to prevent release of said tongue 104 from said buckle receiver 102 without use of said release assembly 126.

Figures 2A, 2B:
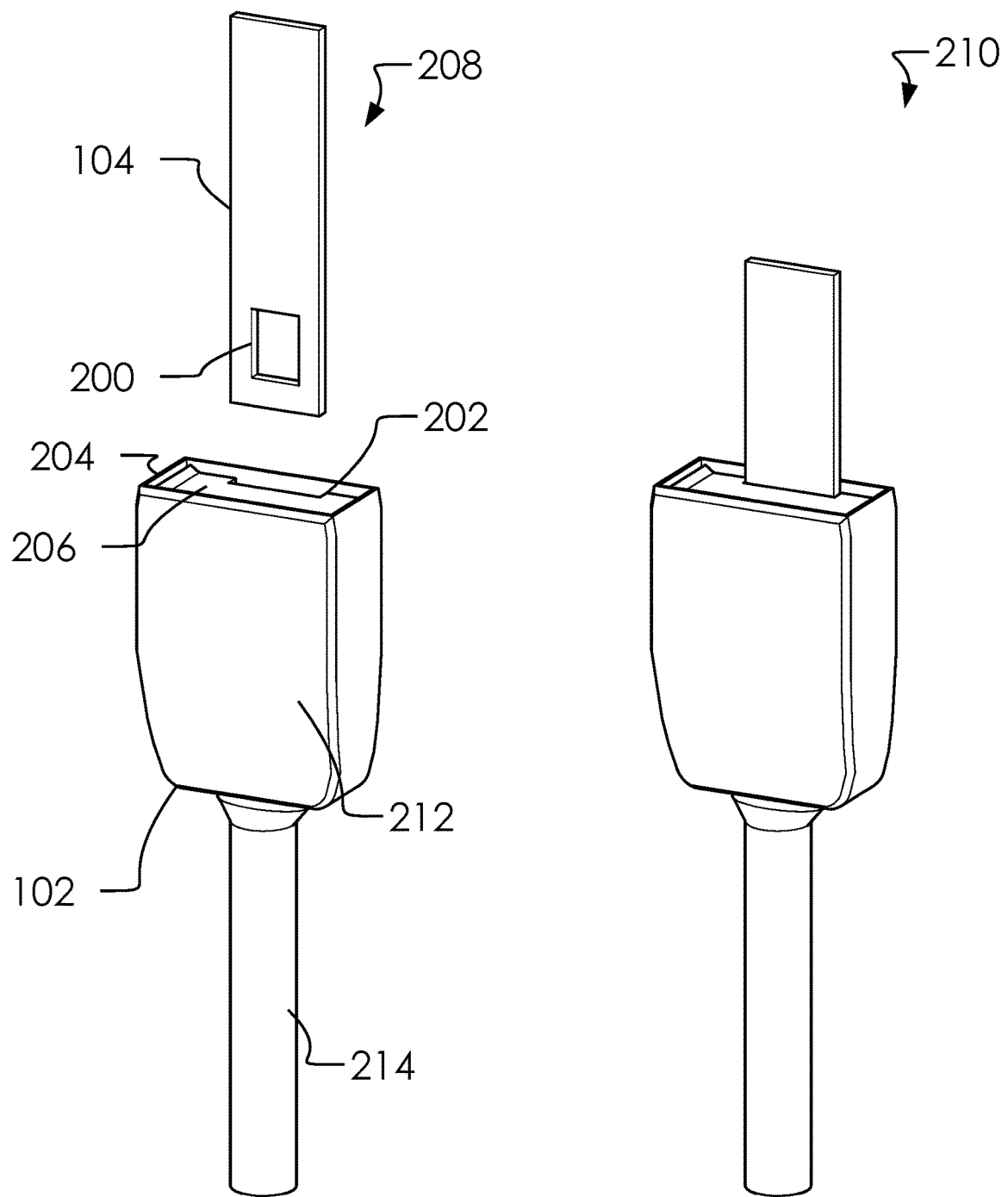
FIGS. 2A, and 2B illustrate a perspective overview of a tongue 104 and a buckle receiver 102 with said tongue 104 in a detached configuration 208 and an attached configuration 210.
Figure 3A:
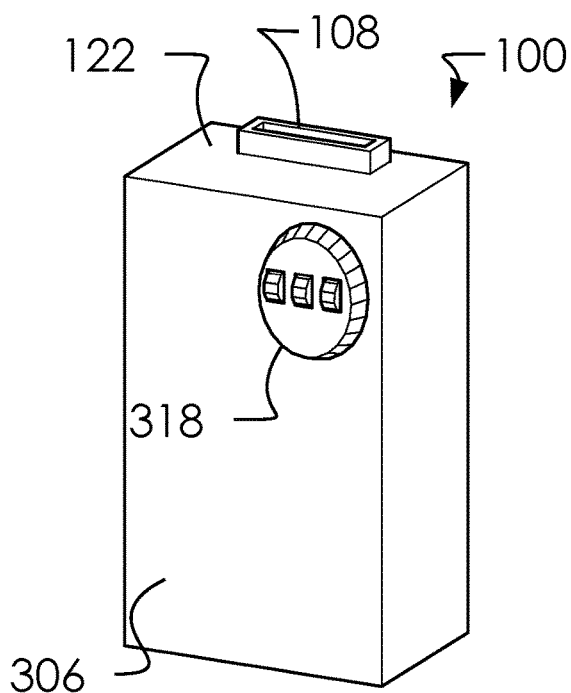
FIGS. 3A, 3B, 3C, and 3D illustrate two perspective overviews and two elevated side views of a lock shell 100.
Figure 3B:
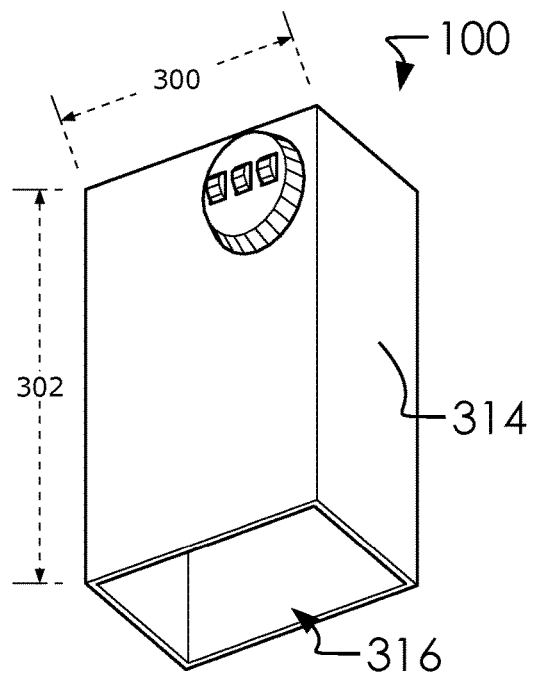
Figure 3C:
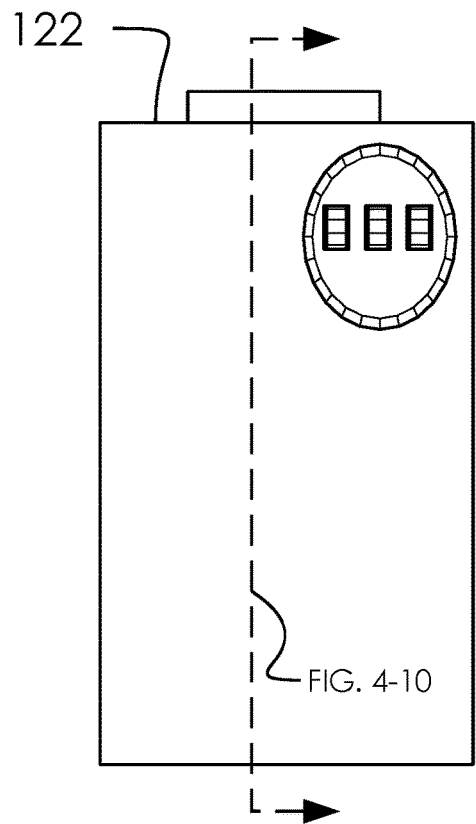
Figure 3D:
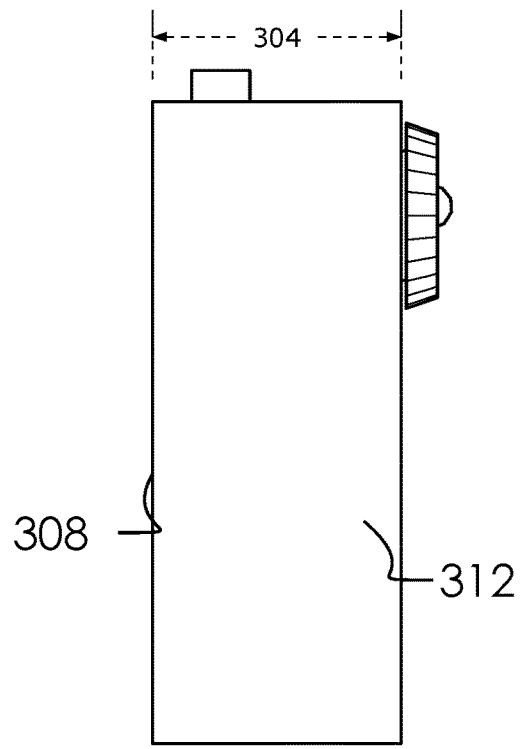

FIGS. 2A, and 2B illustrate a perspective overview of said tongue 104 and said buckle receiver 102 with said tongue 104 in a detached configuration 208 and an attached configuration 210.

In one embodiment, said tongue 104 can comprise a buckle slot 200 at said first end 118, as illustrated. In one embodiment, said buckle receiver 102 can comprise a tongue receiver slot 202, a top aperture 204, and a release button 206, as is known in the art.

In one embodiment, said buckle receiver 102 can comprise a head portion 212 and a support portion 214.

FIGS. 3A, 3B, 3C, and 3D illustrate two perspective overviews and two elevated side views of said lock shell 100.

In one embodiment, said lock shell 100 can comprise a width 300, a height 302, a depth 304, a front side 306, a back side 308, a top side 310, a first side 312, a second side 314 and a bottom end 316.

In one embodiment, said gun lock system 106 can further comprise a lock 318. In one embodiment, said lock 318 can be mounted to said front side 306 of said lock shell 100.

Figure 4:
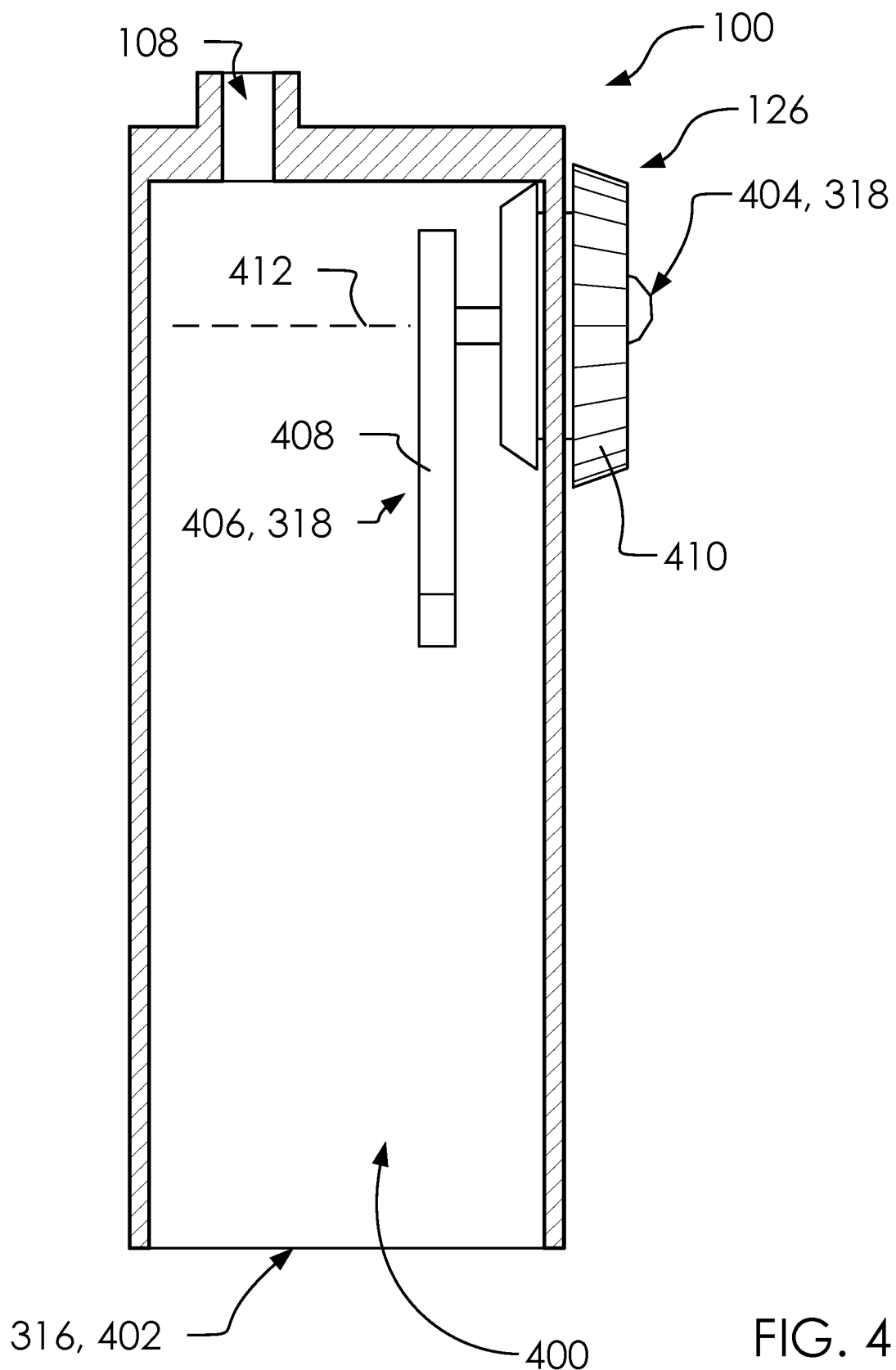
FIG. 4 illustrates a cross-section elevated side view of said lock shell 100.

FIG. 4 illustrates a cross-section elevated side view of said lock shell 100.

In one embodiment, said gun lock system 106 can comprise a cavity 400 within a portion of said lock shell 100. In one embodiment, said cavity 400 can be accessible through said tongue slot 108 at said top surface 122, and a bottom opening 402 at said bottom end 316.

In one embodiment, said lock 318 can comprise an exterior portion 404 and an internal portion 406. Said internal portion 406 can comprise a portion of said lock 318 within said cavity 400 and can further comprise a button pressing extension 408 configured to press a portion of said release button 206 of said buckle receiver 102 by activating an unlocking mechanism 410 on said exterior portion 404.

In one embodiment, said button pressing extension 408 can be configured to rotate about a rotational axis 412 so as to rotate said button pressing extension 408 between unlocking position 500 and locking position 600 (illustrated below).

Figure 5:
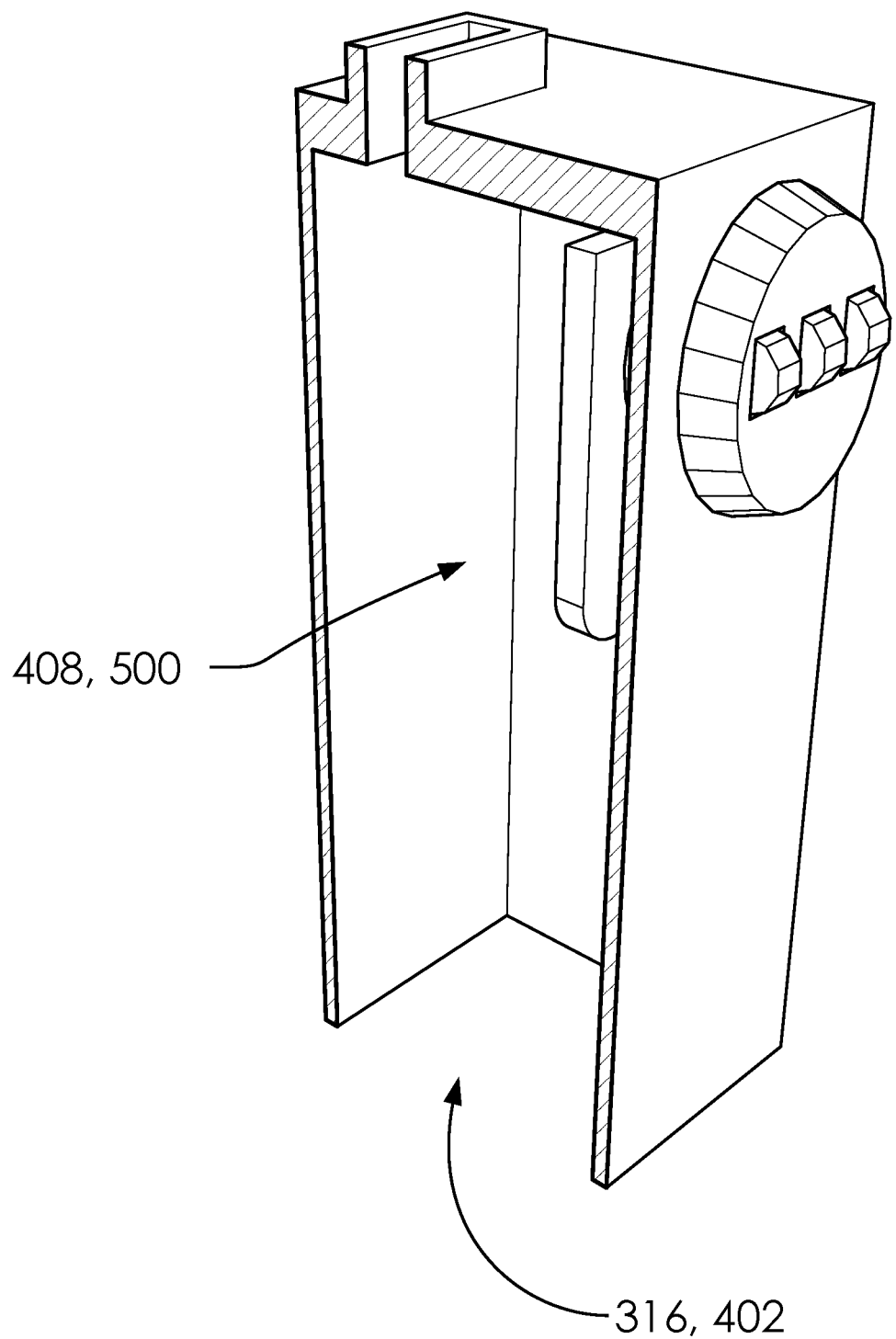
FIG. 5 illustrates a cross-section perspective overview of said lock shell 100 with a button pressing extension 408 in unlocking position 500.

FIG. 5 illustrates a cross-section perspective overview of said lock shell 100 with said button pressing extension 408 in said unlocking position 500.

Figure 6:
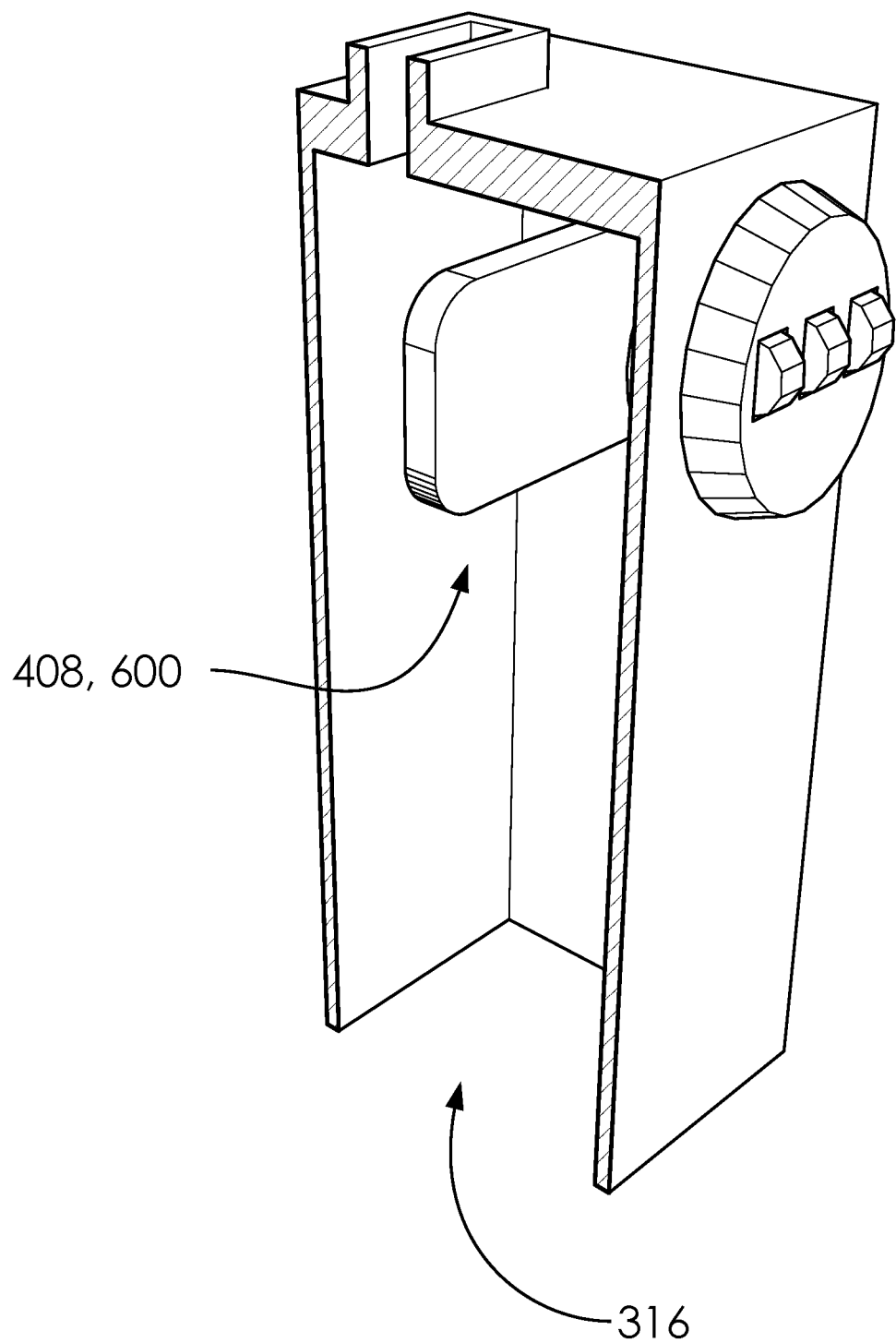
FIG. 6 illustrates a cross-section perspective overview of said lock shell 100 with said button pressing extension 408 in locking position 600.

FIG. 6 illustrates a cross-section perspective overview of said lock shell 100 with said button pressing extension 408 in said locking position 600.

Figure 7:
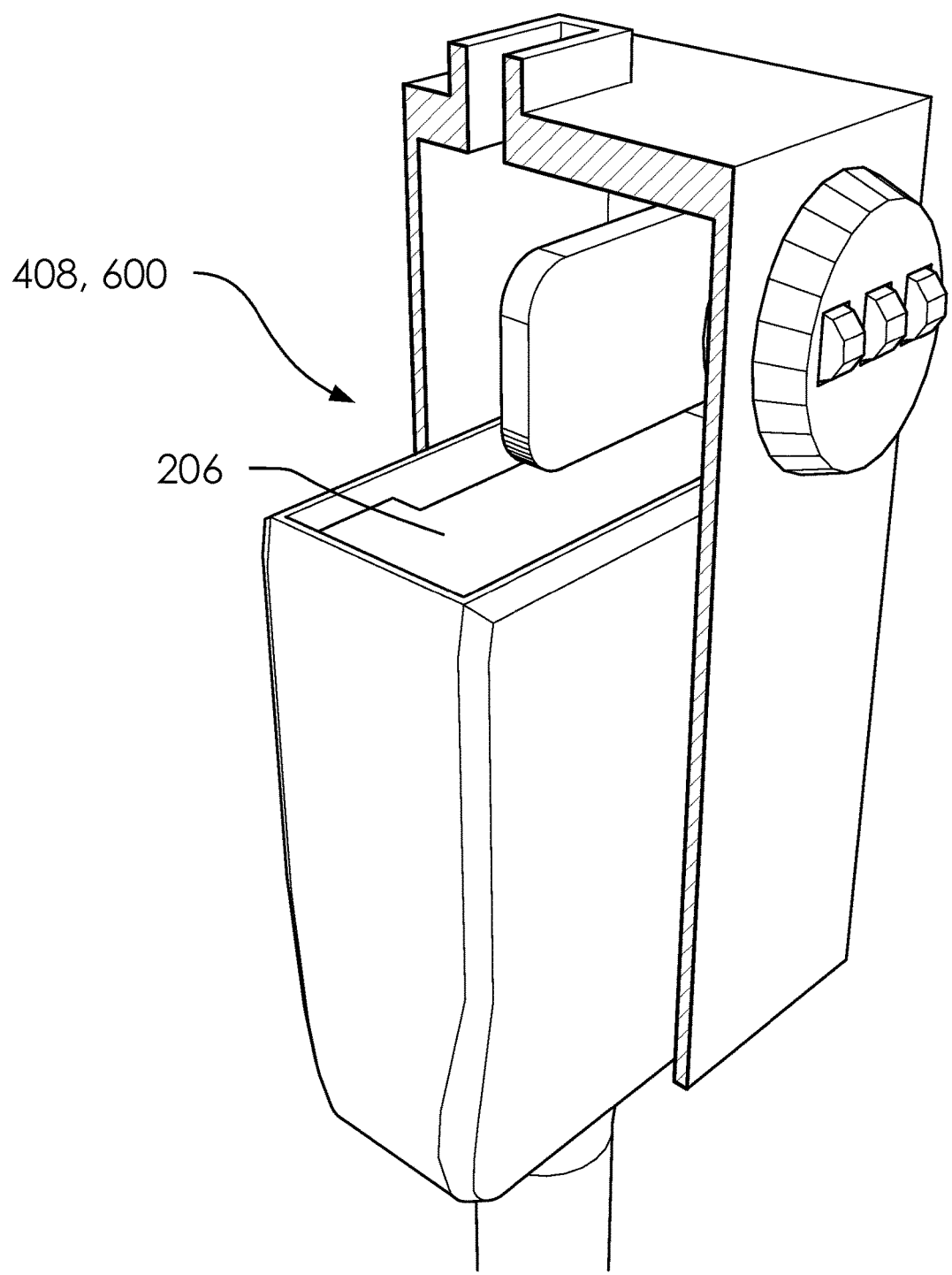
FIG. 7 illustrates a cross-section perspective overview of said lock shell 100 with said buckle receiver 102 and said button pressing extension 408 in said locking position 600.

FIG. 7 illustrates a cross-section perspective overview of said lock shell 100 with said buckle receiver 102 and said button pressing extension 408 in said locking position 600.

Figure 8:
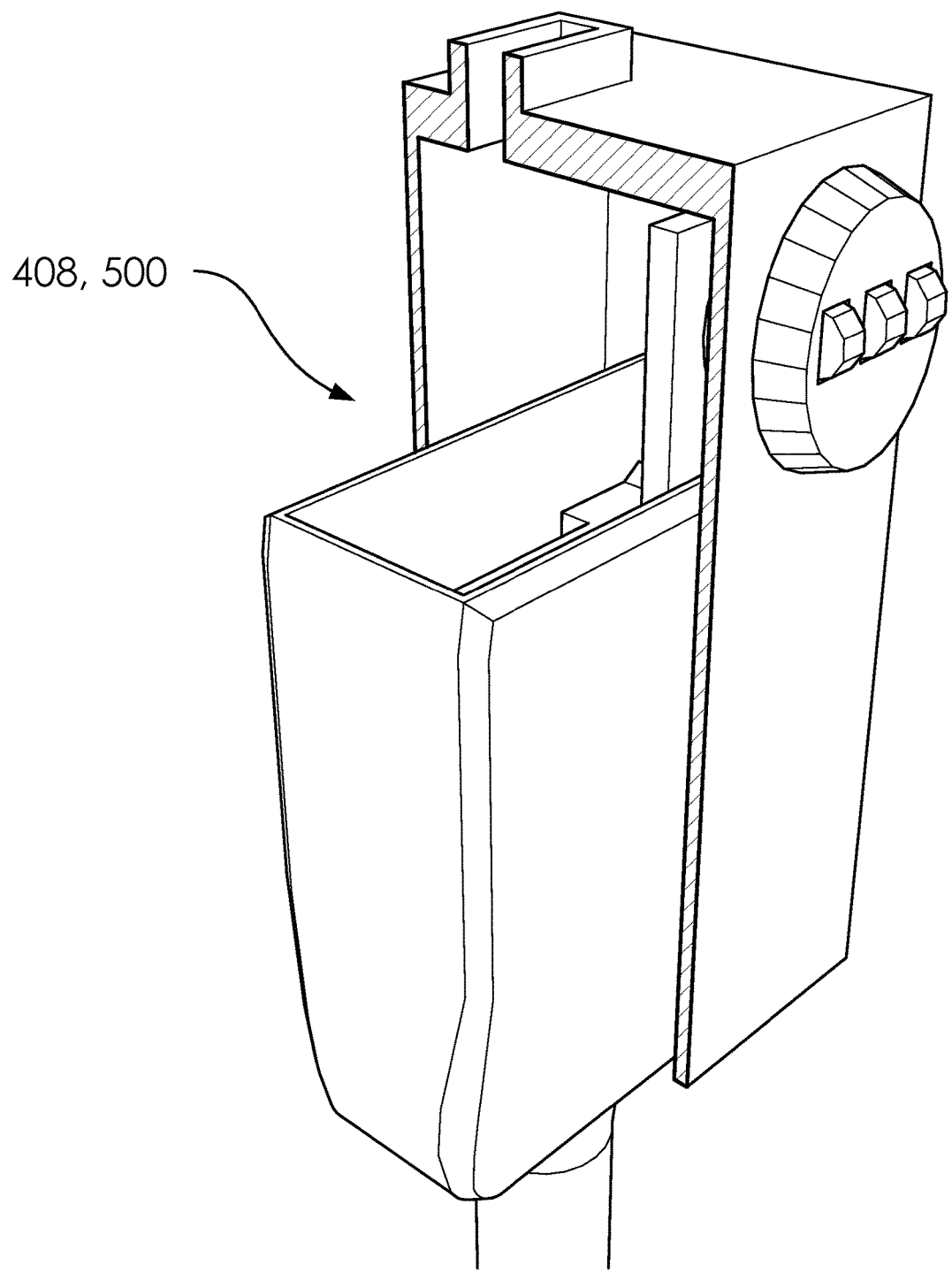
FIG. 8 illustrates a cross-section perspective overview of said lock shell 100 with said buckle receiver 102 and said button pressing extension 408 in said unlocking position 500.

FIG. 8 illustrates a cross-section perspective overview of said lock shell 100 with said buckle receiver 102 and said button pressing extension 408 in said unlocking position 500.

Figure 9:
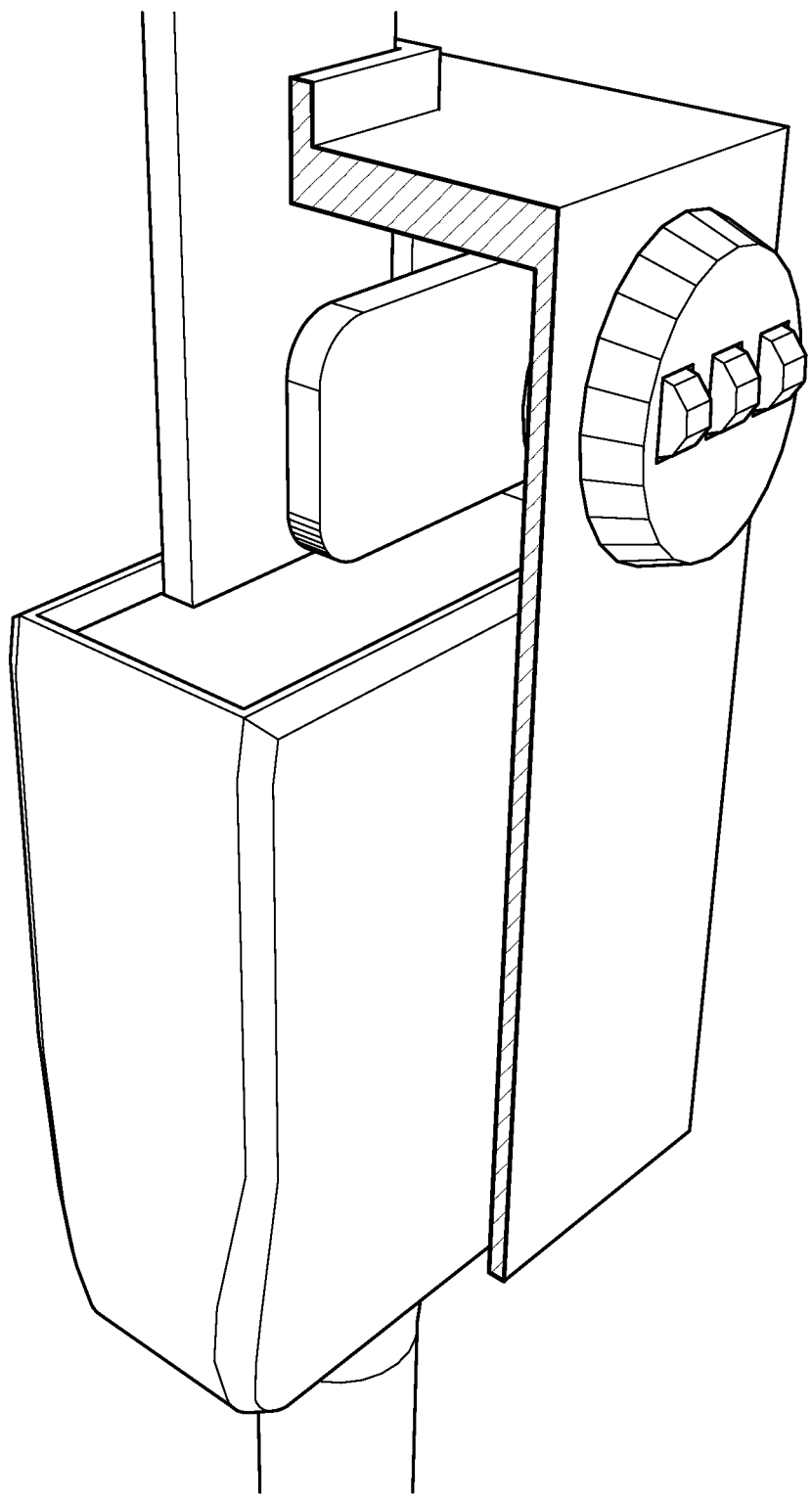
FIG. 9 illustrates a cross-section perspective overview of said lock shell 100, said buckle receiver 102, and said tongue 104 with said button pressing extension 408 in said locking position 600.

FIG. 9 illustrates a cross-section perspective overview of said lock shell 100, said buckle receiver 102, and said tongue 104 with said button pressing extension 408 in said locking position 600.

Figure 10:
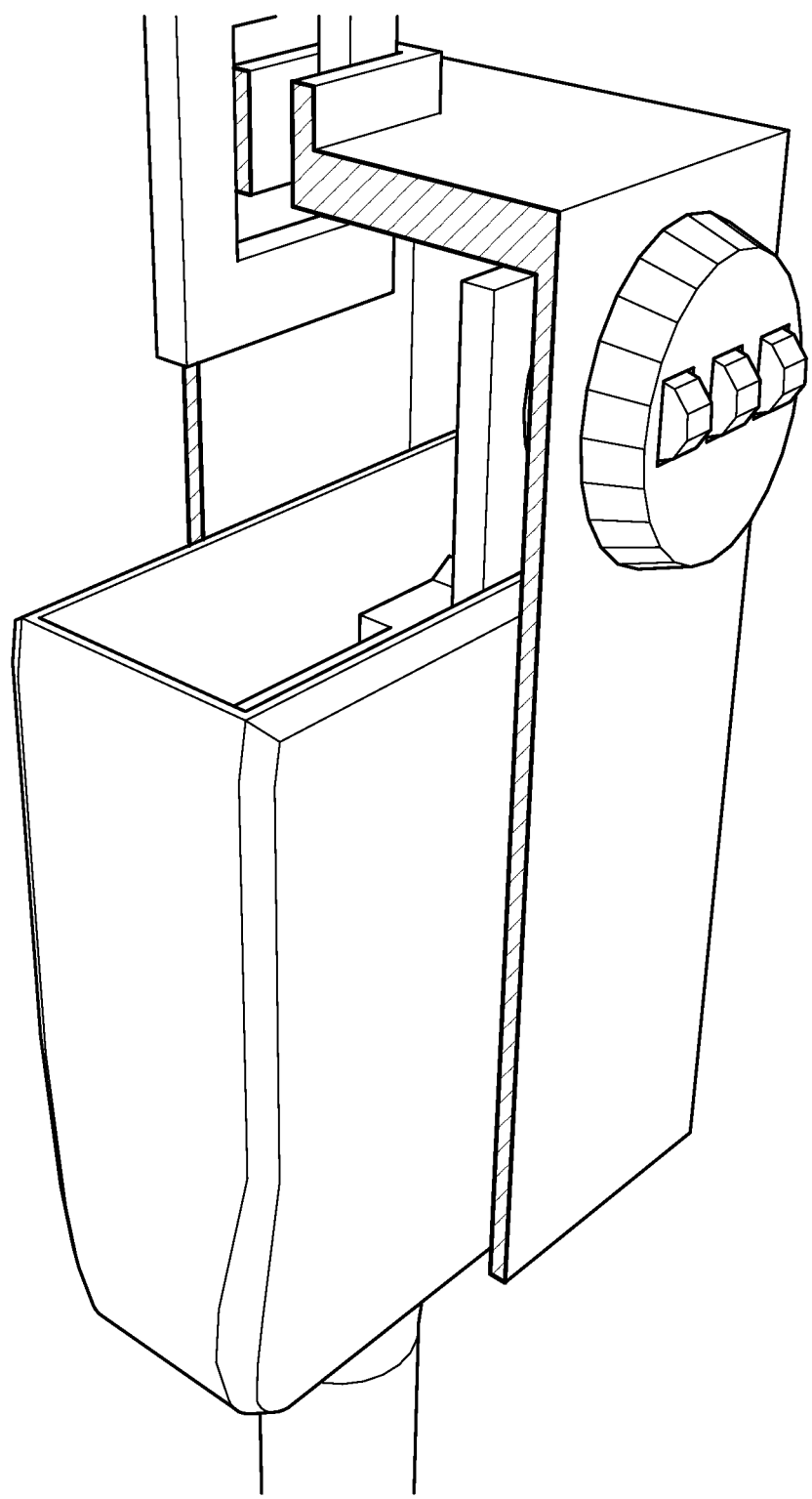
FIG. 10 illustrates a cross-section perspective overview of said lock shell 100, said buckle receiver 102, and said tongue 104 with said button pressing extension 408 in said unlocking position 500.

FIG. 10 illustrates a cross-section perspective overview of said lock shell 100, said buckle receiver 102, and said tongue 104 with said button pressing extension 408 in said unlocking position 500.

As illustrated, by turning said button pressing extension 408, a portion of said release button 206 can be pressed by applying pressure with a portion said button pressing extension 408 within said cavity 400. Likewise, said release button 206 can be released by removing pressure on said release button 206 with said button pressing extension 408.

Since access to said cavity 400 can be blocked at said bottom opening 402 with said buckle receiver 102 and at said tongue slot 108 by said tongue 104, said gun lock system 106 can achieve the result of preventing the release of said tongue 104 by normal means other than by turning or activating said lock 318.

In one embodiment, said release assembly 126 comprises said lock 318, said button pressing extension 408 and said unlocking mechanism 410. Said lock 318 can be configured to selectively activate or deactivated said unlocking mechanism 410. Said unlocking mechanism 410 can be configured to engage or disengage said button pressing extension 408. Said button pressing extension 408 is configured to selectively activate said release button 206 of said buckle receiver 102 between said unlocking position 500 and said locking position 600.

Figure 11:
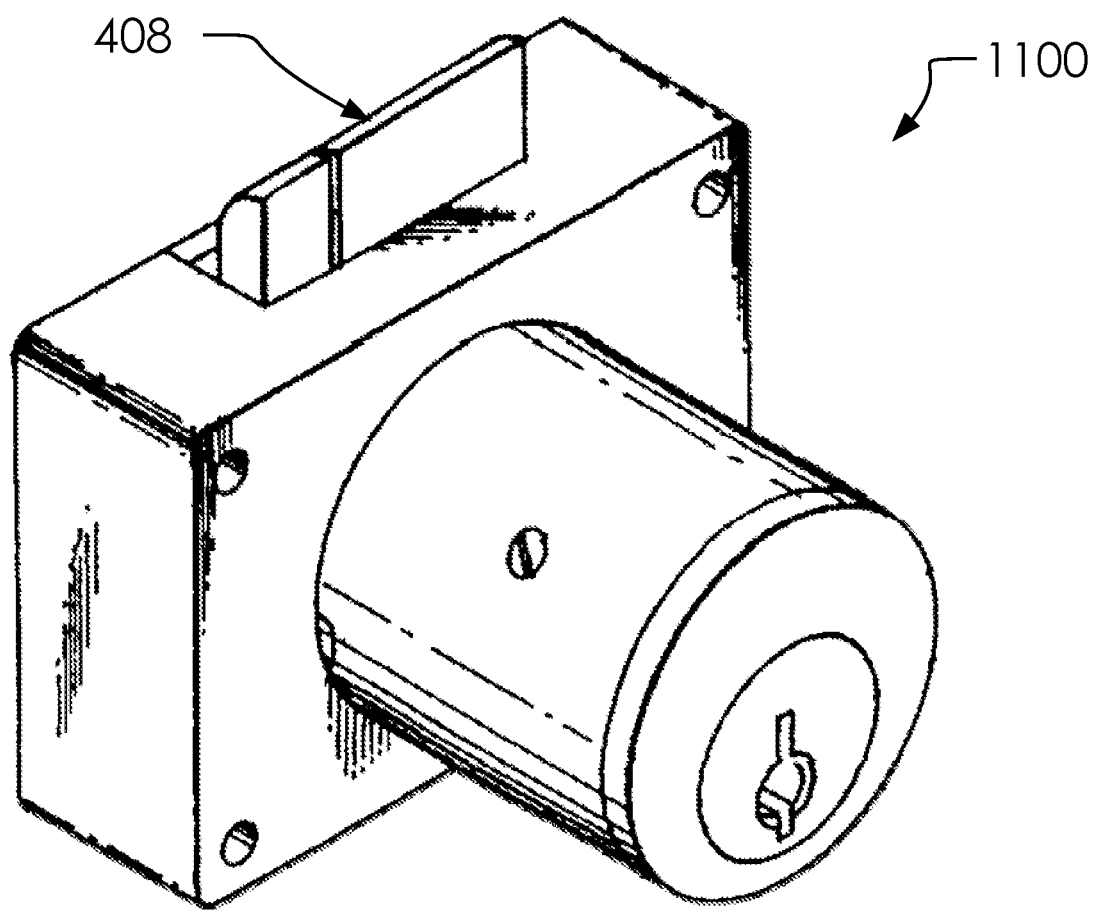
FIG. 11 illustrates a perspective overview of a drawer lock 1100.

FIG. 11 illustrates a perspective overview of a drawer lock 1100.

In one embodiment, said lock 318 can comprise a variation of design where said button pressing extension 408 is pressed up and down (as shown in said drawer lock 1100, rather than rotating (as illustrated in FIGS. 4-10).

In one embodiment, said release assembly 126 comprises said drawer lock 1100; wherein, said button pressing extension 408 can be configured to slide up and down within said cavity 400 so as to press and release said button pressing extension 408 between said unlocking position 500 and said locking position 600.

Figure 12A:
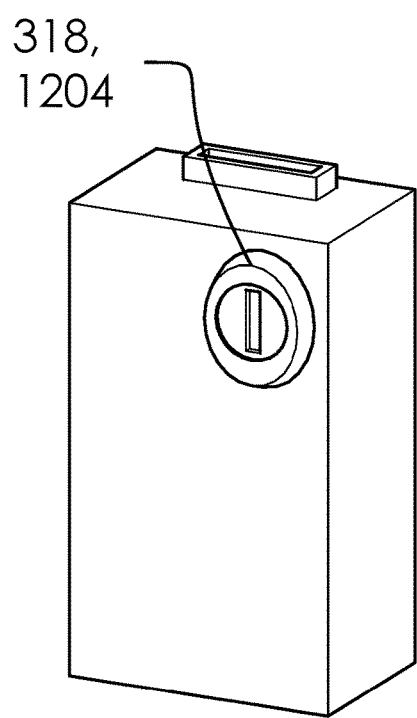
FIGS. 12A, and 12B illustrate a perspective overview of a lock 318 as a combination lock 1200 and a keyed lock 1204.
Figure 12B:
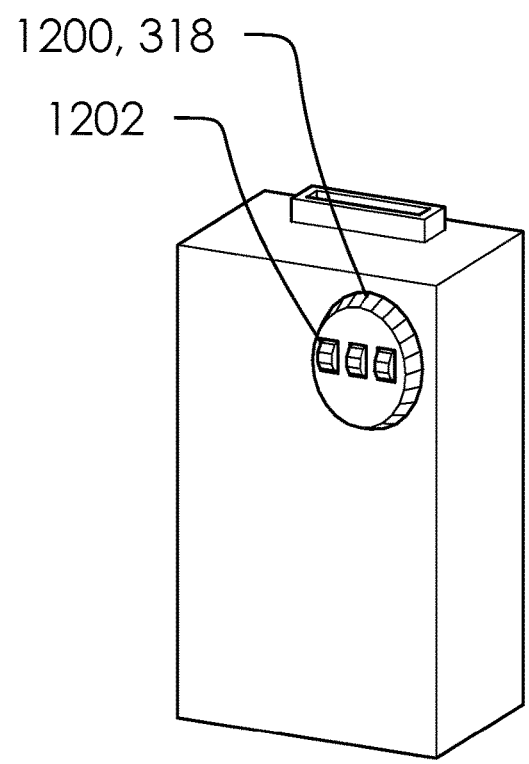

FIGS. 12A, and 12B illustrate a perspective overview of said lock 318 as a combination lock 1200 and a keyed lock 1204.

In one embodiment, said lock 318 can comprise said combination lock 1200 having one or more combination dials 1202, as illustrated and known in the art. Wherein, said one or more combination dials 1202 can be adjusted so as to release said button pressing extension 408 for action within said cavity 400, as discussed above.

As illustrated said lock 318 can comprise said keyed lock 1204, but in other embodiments, it can be a combination lock or any known to be functional in the art, including electronic locking and unlocking systems.

In the current embodiment this can comprise inserting a key into said unlocking mechanism 410, and turning said key to cause said button pressing extension 408 to turn within said cavity 400.

Figure 13:
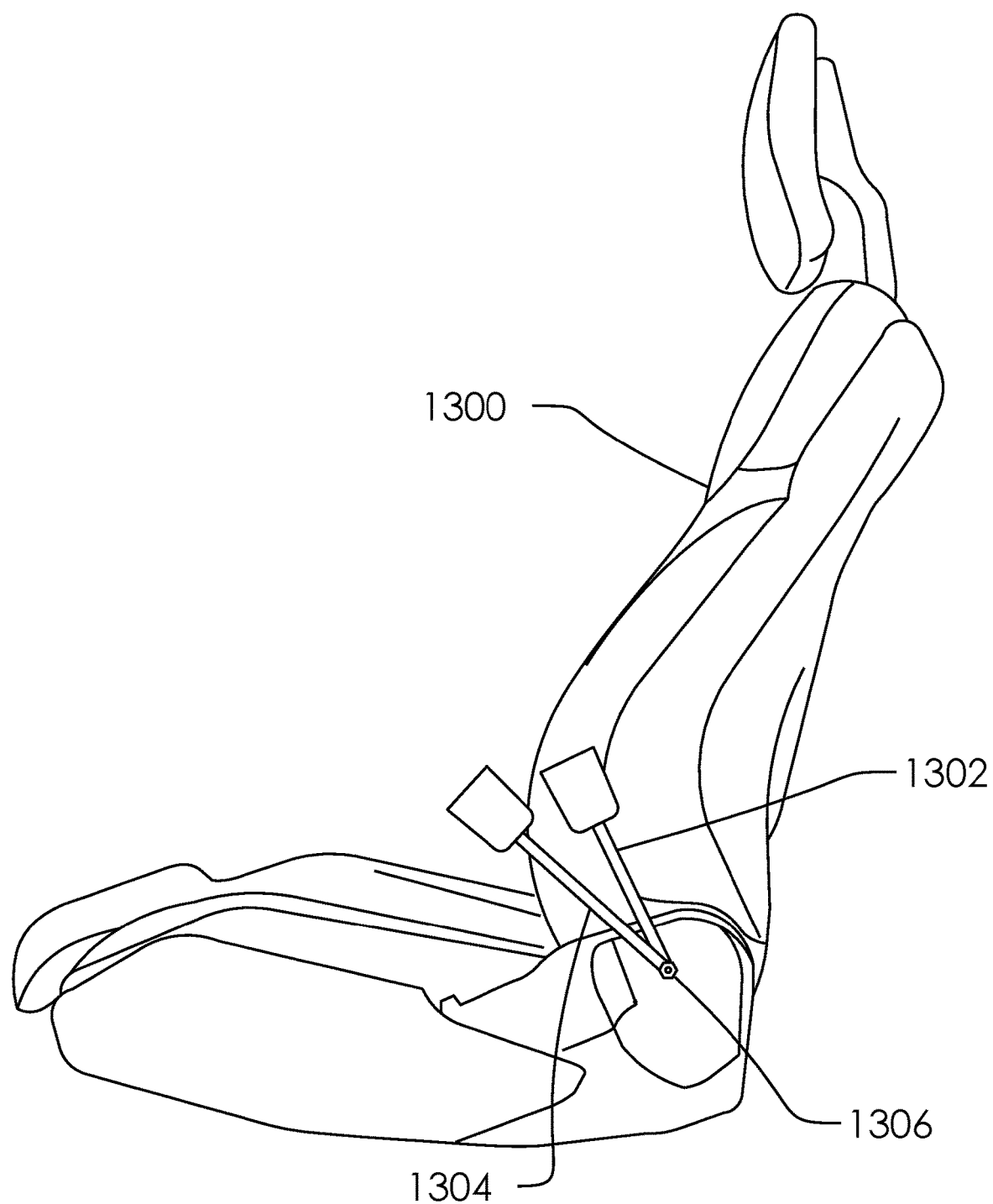
FIG. 13 illustrates an elevated side view of a car seat 1300.

FIG. 13 illustrates an elevated side view of a car seat 1300.

In one embodiment, said gun lock system 106 can attach to said buckle receiver 102, whether an OEM receiver 1302 or an extra receiver 1304.

In one embodiment, said OEM receiver 1302 and/or said extra receiver 1304 can be attached to a portion of a vehicle, such as said car seat 1300. In one embodiment, said extra receiver 1304 can be attached a bolt 1306 provided for holding said OEM receiver 1302, and in some embodiments, said extra receiver 1304 can be secured within a vehicle at other bolt receivers.

Figure 14A:
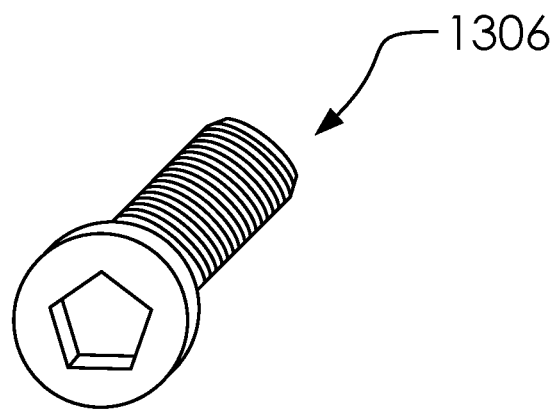
FIGS. 14A, and 14B illustrate a perspective overview and elevated side view of a bolt 1306.
Figure 14B:
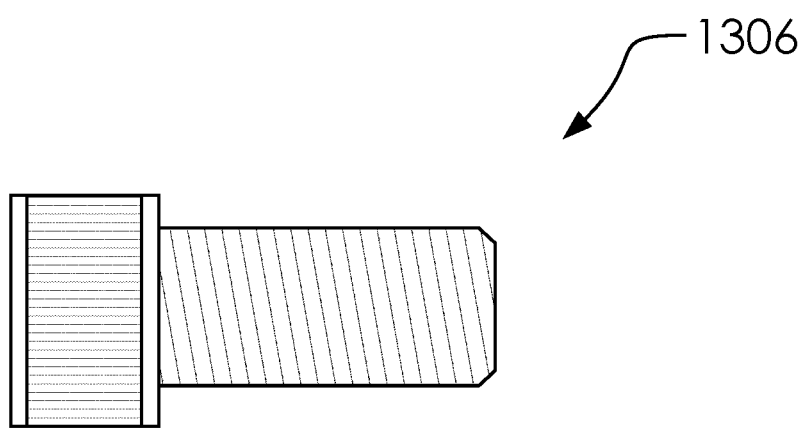

FIGS. 14A, and 14B illustrate a perspective overview and elevated side view of said bolt 1306.

In one embodiment, said bolt 1306 can comprise a tamper proof bolt to prevent removal for purposes of theft. In one embodiment, said bolt 1306 can be added to said car seat 1300 and or said vehicle. In another case, said bolt 1306 can replace the OEM bolt already in use.

Figure 15A:
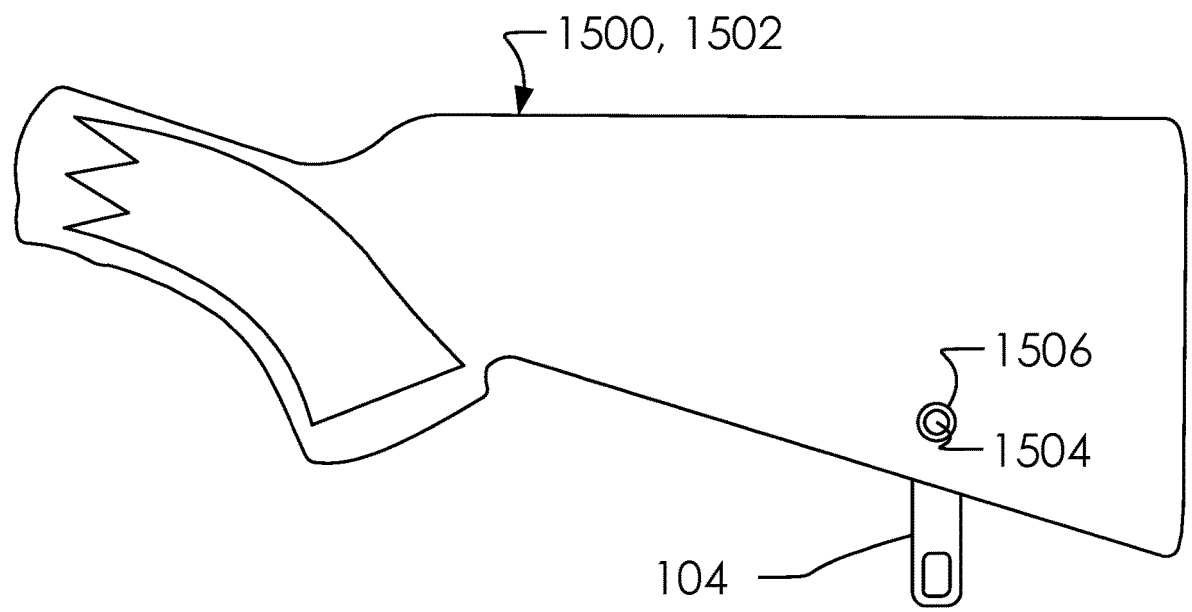
FIGS. 15A, and 15B illustrate two elevated side views of a buttstock end 1502 of a firearm 1500.
Figure 15B:
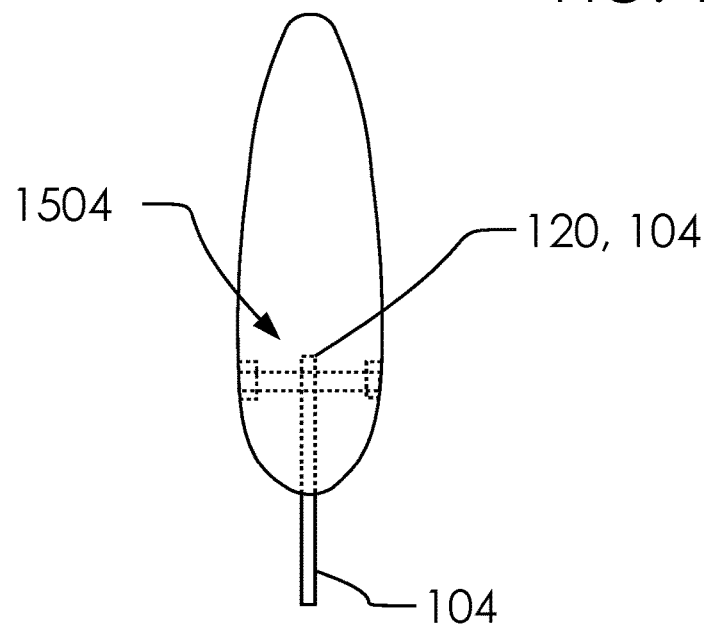

FIGS. 15A, and 15B illustrate two elevated side views of a buttstock end 1502 of a firearm 1500.

In one embodiment, said gun lock system 106 can comprise one or more tools for attaching said tongue 104 to said firearm 1500. In one embodiment, said gun lock system 106 can comprise a buttstock anchor 1504. In one embodiment, said buttstock anchor 1504 can comprise a horizontal anchor shaft 1506; wherein, said horizontal anchor shaft 1506 can inserted through a shaft through a portion of said buttstock end 1502, and said tongue 104 can be held within a portion of said buttstock end 1502 by said horizontal anchor shaft 1506. In one embodiment, said second end 120 of said tongue 104 can be inserted through a lower aperture in said buttstock end 1502, extend up to said horizontal anchor shaft 1506, and a portion of said buttstock anchor 1504 can be inserted through a portion of said second end 120 of said tongue 104.

In one embodiment, said buttstock end 1502 can be configured so as to allow said tongue 104 to rotate up and completely inside of said buttstock end 1502 when not in use. Wherein, said tongue 104 can rotate on said buttstock anchor 1504 and said buttstock end 1502 can comprise a tongue cavity for storing said tongue 104 (not illustrated). In one embodiment, said tongue 104 can rotate on said buttstock anchor 1504, in another embodiment, said tongue 104 can slide in and out of said buttstock end 1502 in an up and down direction for storage.

Figure 16:
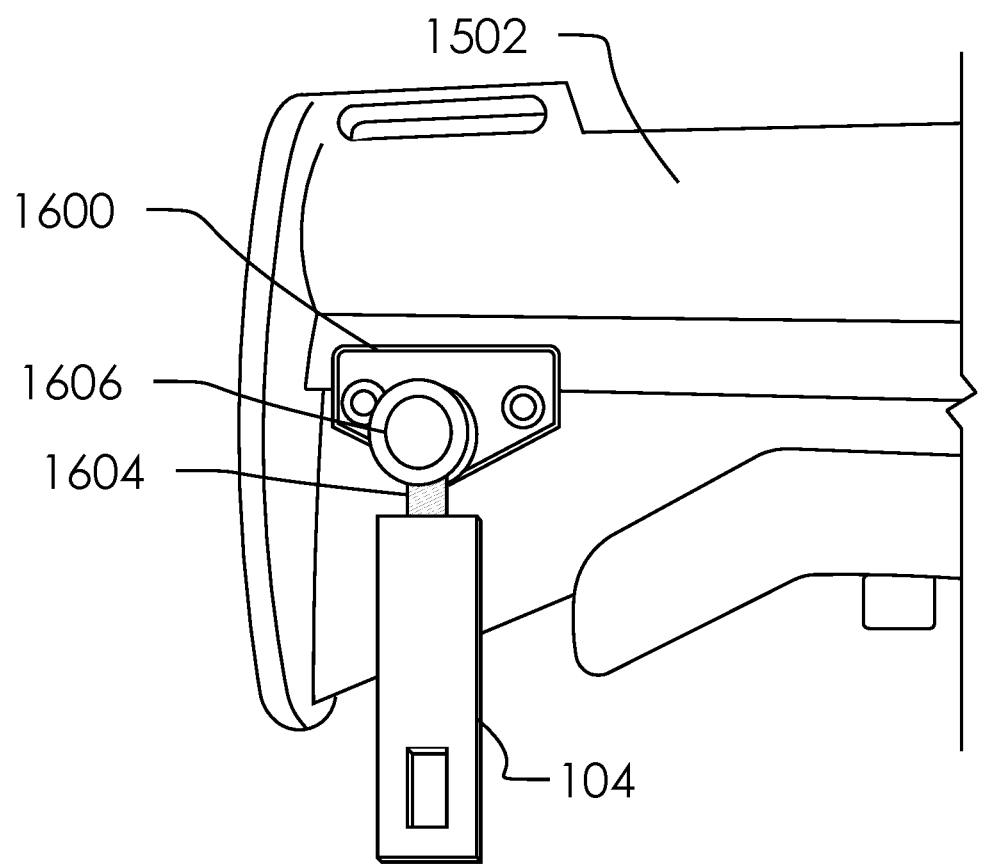
FIG. 16 illustrates a perspective overview of said buttstock end 1502 with a tongue bolting bracket 1600.

FIG. 16 illustrates a perspective overview of said buttstock end 1502 with a tongue bolting bracket 1600.

In one embodiment, said gun lock system 106 can further comprise said tongue bolting bracket 1600. In one embodiment, said tongue bolting bracket 1600 can be attached to a portion of said firearm 1500, such as said buttstock end 1502, and said tongue 104 can be attached to said tongue bolting bracket 1600. For example, said tongue 104 can be attached to a portion of said tongue bolting bracket 1600 with a threaded shaft 1602, welding, or similar. In one embodiment, said tongue bolting bracket 1600 can comprise a pivoting receiver extension 1604 configured to allow said tongue 104 to rotate about said tongue bolting bracket 1600.

In one embodiment, said buttstock end 1502 can comprise an AR buttstock.

FIGS. 17A, 17B, 17C, and 17D illustrate a perspective overview of a buttstock wrap assembly 1700.

In one embodiment, said gun lock system 106 can comprise said buttstock wrap assembly 1700 configured to wrap around said buttstock end 1502 of said firearm 1500 and securely hold said tongue 104 for attachment to said buckle receiver 102.

In one embodiment, said buttstock wrap assembly 1700 can comprise lower cradle 1702, strap 1704 having a first end 1706 and a second end 1708, a first end bracket 1710, and a second end bracket 1712. In one embodiment, said buttstock wrap assembly 1700 can be configured to wrap around said buttstock end 1502, securely extend said first end 1706 toward said second end 1708, hold a lower portion of said buttstock end 1502 in said lower cradle 1702, attach said first end bracket 1710 to said second end bracket 1712, and hold said tongue 104 to said buttstock end 1502.

In one embodiment, said strap 1704 can comprise a rubber coated flat cable.

In one embodiment, said second end bracket 1712 can comprise a receiver slot 1714, and said first end bracket 1710 can comprise a receiver extension 1716. Wherein, said receiver extension 1716 can attach to said second end bracket 1712 by sliding said receiver slot 1714 into said receiver extension 1716 and applying pressure along the length of said strap 1704 to pull said receiver slot 1714 and said receiver extension 1716 away from one another.

In one embodiment, said buttstock wrap assembly 1700 can further comprise tightening nut 1718. In one embodiment, a user can tighten up said lower cradle 1702 within said strap 1704 by twisting said tightening nut 1718 so as to press said lower cradle 1702 into said firearm 1500. In one embodiment, said tightening nut 1718 can be integrated into said strap 1704 so as to prevent rotation of said buttstock wrap assembly 1700 without liberating said tongue 104 from said buckle receiver 102. In one embodiment, attaching said buttstock wrap assembly 1700 to said firearm 1500 can be easily accomplished when said tongue 104 is not attached to said buckle receiver 102, and very difficult once said buckle receiver 102 and said tongue 104 are attached to one another.

In one embodiment, said tongue 104 can be twisted through a portion of said strap 1704 and said tightening nut 1718 so as to tighten said lower cradle 1702 into or out of said buttstock end 1502.

In one embodiment, said tongue 104 can swivel relative to said lower cradle 1702 so as to allow movement of said firearm 1500 attached to said gun lock system 106.

Figure 18A:
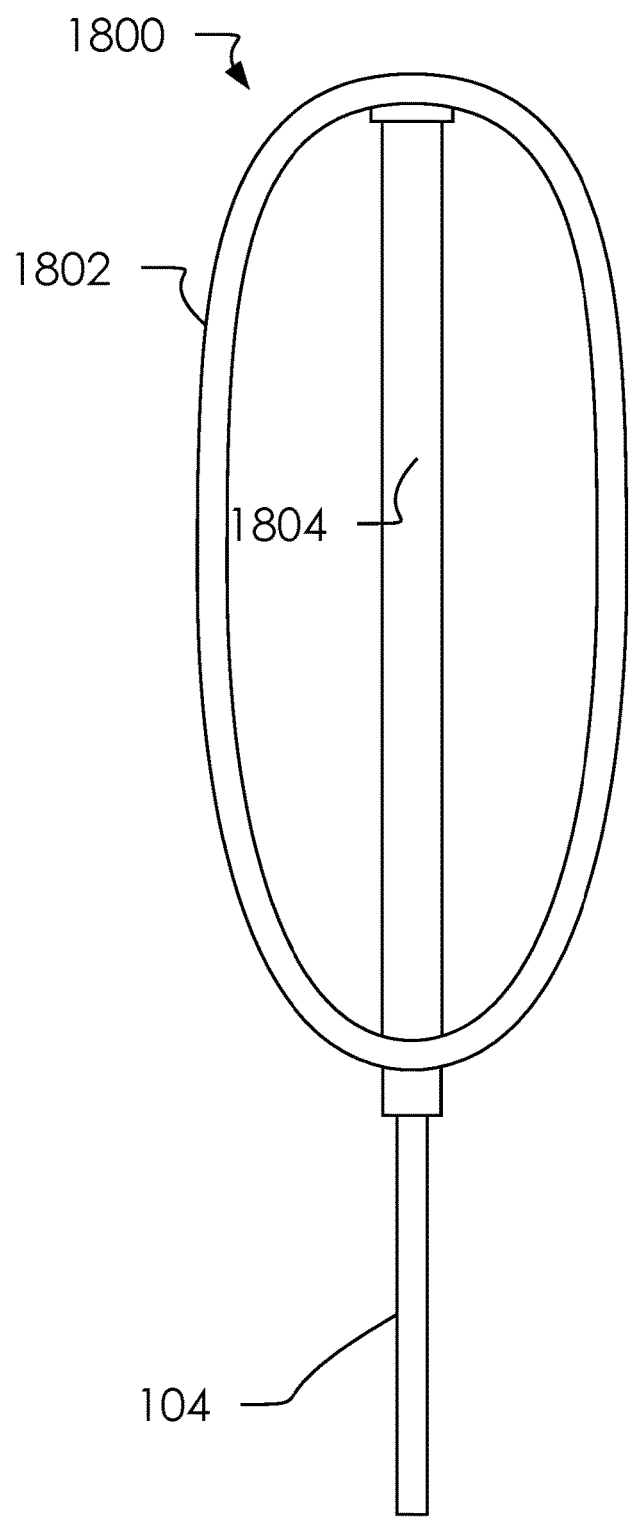
FIGS. 18A, and 18B illustrate an elevated side and front side view of a wrap and drill bracket 1800.
Figure 18B:
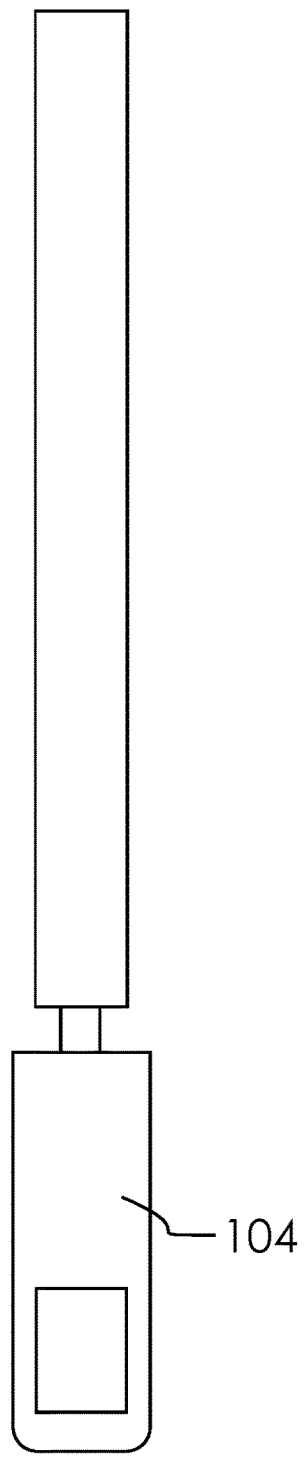

FIGS. 18A, and 18B illustrate an elevated side and front side view of a wrap and drill bracket 1800. FIG. 18C comprises a solid strap slide on wrap 1806.

In one embodiment, said wrap and drill bracket 1800 can comprise an exterior wrap around ring 1802, a center shaft 1804 and said tongue 104.

In one embodiment, said exterior wrap around ring 1802 can extend around a perimeter of said buttstock end 1502, and 1804 can be drilled through a portion of said buttstock end 1502. Once attached to one another, the parts of said wrap and drill bracket 1800 can be difficult to remove and therefore prevent theft of said firearm 1500. In one embodiment, said tongue 104 can attach to a portion of said wrap and drill bracket 1800, such as said center shaft 1804.

In one embodiment, said solid strap slide on wrap 1806 can attach to said buttstock end 1502 of said firearm 1500 or a barrel of said firearm 1500. Wherein, said solid strap slide on wrap 1806 can be removed easily once said tongue 104 is detached from said buckle receiver 102 by rotating said tongue 104 apart from the remaining portions of said solid strap slide on wrap 1806 so as to loosen said lower cradle 1702. On the other hand, with said solid strap slide on wrap 1806 or said buttstock wrap assembly 1700 attached to said firearm 1500, the body of said firearm 1500 will interfere with the spinning of said tongue 104 and thereby prevent theft of said firearm 1500.xy5

Figure 19A:
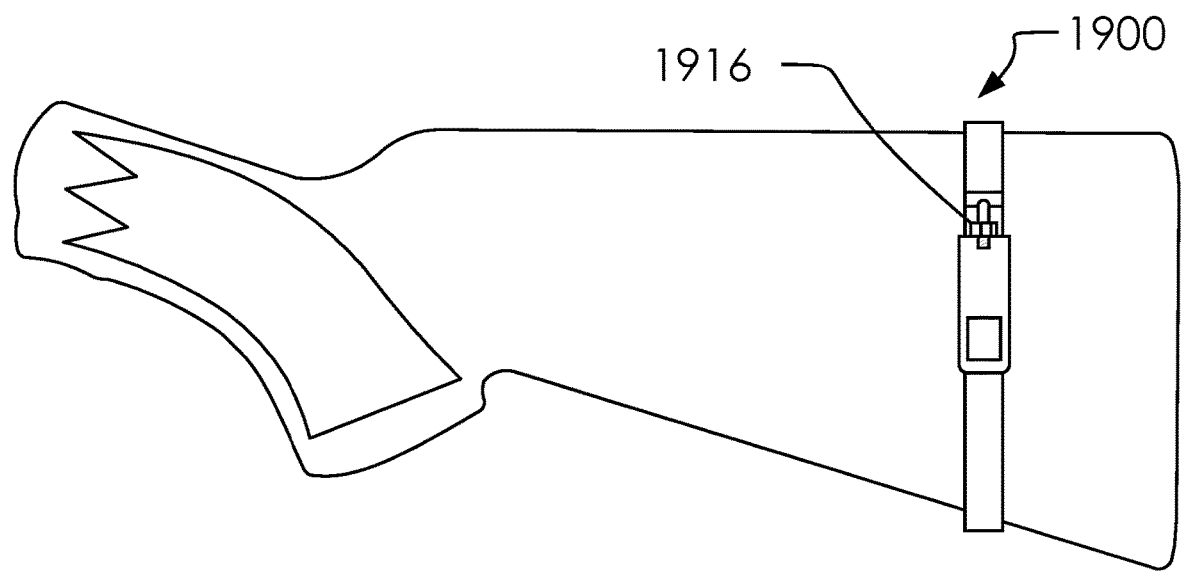
FIGS. 19A, and 19B illustrate an elevated side and rear view of a ratcheting strap assembly 1900.
Figure 19B:
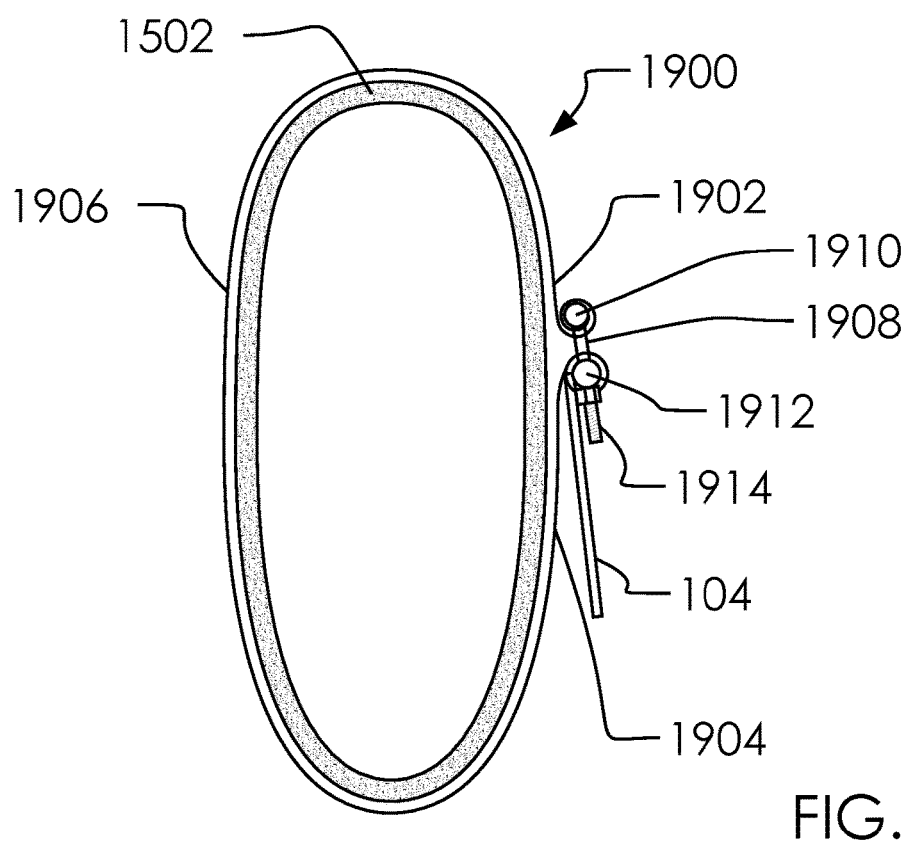

FIGS. 19A, and 19B illustrate an elevated side and rear view of a ratcheting strap assembly 1900.

In one embodiment, said gun lock system 106 can comprise said ratcheting strap assembly 1900 configured to attach said tongue 104 to said buttstock end 1502.

In one embodiment, said ratcheting strap assembly 1900 can comprise a first end 1902, a second end 1904, a strap portion 1906, a bridge portion 1908, a first axis 1910, a second axis 1912, a threaded shaft 1914, and a nut 1916.

In one embodiment, said ratcheting strap assembly 1900 can attach to said buttstock end 1502 by wrapping said strap portion 1906 around said buttstock end 1502, attaching said first end 1902 to said second end 1904 by screwing said threaded shaft 1914 into a portion of said bridge portion 1908, and tightening said nut 1916 until said strap portion 1906 is firmly attached to said buttstock end 1502. In one embodiment, said tongue 104 can be attached to a portion of said ratcheting strap assembly 1900, as illustrated.

Figure 20:
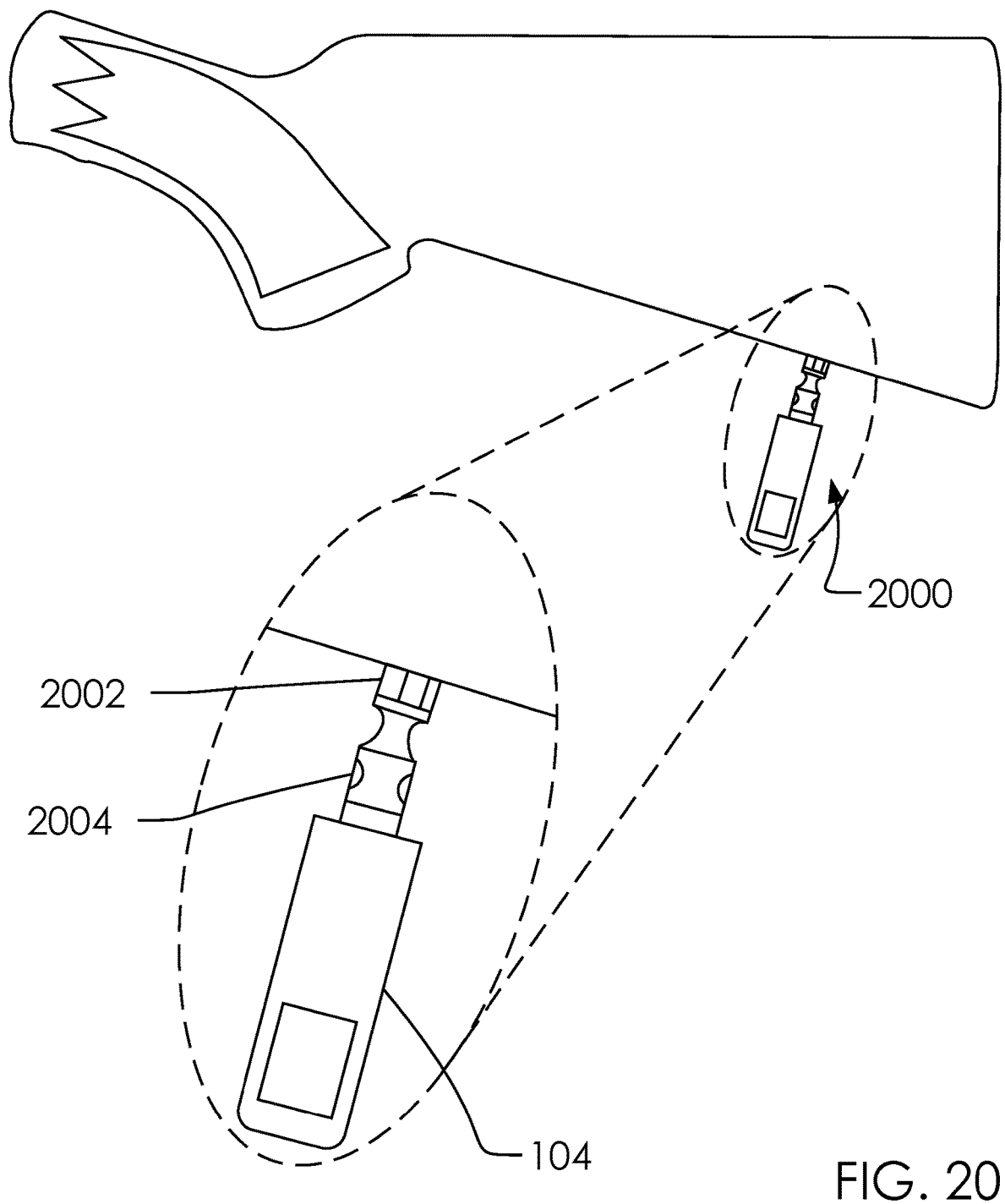
FIG. 20 illustrates an elevated side view and detailed view of said buttstock end 1502 with a bolt on assembly 2000.

FIG. 20 illustrates an elevated side view and detailed view of said buttstock end 1502 with a bolt on assembly 2000.

In one embodiment, said gun lock system 106 can comprise said bolt on assembly 2000 configured to rotatably attach said tongue 104 to said buttstock end 1502. In one embodiment, said bolt on assembly 2000 can comprise a screw in bolt assembly 2002, a pivot assembly 2004 and said tongue 104. In one embodiment, said screw in bolt assembly 2002 can screw into a portion of said buttstock end 1502 and hold said bolt on assembly 2000 to said firearm 1500. In one embodiment, said pivot assembly 2004 can allow said tongue 104 to rotate relative to said buttstock end 1502, as illustrated.

PARTS LIST said lock shell 100,
said buckle receiver 102,
said tongue 104,
said gun lock system 106,
said tongue slot 108,
said tongue width 110,
said tongue depth 112,
said slot width 114,
said slot depth 116,
said first end 118,
said second end 120,
said top surface 122,
said slot height 124,
said buckle slot 200,
said tongue receiver slot 202,
said top aperture 204,
said release button 206,
said detached configuration 208,
said attached configuration 210,
said width 300,
said height 302,
said depth 304,
said front side 306,
said back side 308,
said top side 310,
said first side 312,
said second side 314,
said bottom end 316,
said lock 318,
said cavity 400,
said bottom opening 402,
said exterior portion 404,
said internal portion 406,
said button pressing extension 408,
said unlocking mechanism 410,
said unlocking position 500,
said locking position 600,
said drawer lock 1100,
said combination lock 1200,
said one or more combination dials 1202,
said keyed lock 1204,
said car seat 1300,
said OEM receiver 1302,
said extra receiver 1304,
said bolt 1306,
said firearm 1500,
said buttstock end 1502,
said buttstock anchor 1504,
said horizontal anchor shaft 1506,
said tongue bolting bracket 1600,
said threaded shaft 1602,
said pivoting receiver extension 1604,
said buttstock wrap assembly 1700,
said lower cradle 1702,
said strap 1704,
said first end 1706,
said second end 1708,
said first end bracket 1710,
said second end bracket 1712,
said receiver slot 1714,
said receiver extension 1716,
said wrap and drill bracket 1800,
said exterior wrap around ring 1802,
said center shaft 1804,
said ratcheting strap assembly 1900,
said first end 1902,
said second end 1904,
said strap portion 1906,
said bridge portion 1908,
said first axis 1910,
said second axis 1912,
said threaded shaft 1914,
said nut 1916,
said bolt on assembly 2000,
said screw in bolt assembly 2002 and
said pivot assembly 2004.

The following sentences summarize the claims:

Said gun lock system 106 for securing a portion of said firearm 1500 for safety and theft-deterence. wherein: said gun lock system 106 comprises said tongue 104, said lock shell 100, and said release assembly 126. Said lock shell 100 comprises said width 300, said height 302, said depth 304, said front side 306, said back side 308, said top side 310, said first side 312, said second side 314 and said bottom end 316. Said lock shell 100 further comprises said tongue slot 108 configured to selectively receive a portion of said tongue 104. Said tongue 104 comprises said tongue width 110 and said tongue depth 112. Said tongue slot 108 comprises said slot width 114 and said slot depth 116. Said tongue 104 comprises said first end 118 and said second end 120. Said first end 118 of said tongue 104 can be configured to selectively mate with said buckle receiver 102. Said bottom end 316 of said lock shell 100 comprises said bottom opening 402 exposing said cavity 400 within said lock shell 100. Said buckle receiver 102 comprises said tongue receiver slot 202, said release button 206 and said head portion 212. Said lock shell 100 can be configured to receive a portion of said head portion 212 of said buckle receiver 102. with a portion of said head portion 212 inside of said lock shell 100, said tongue slot 108 of said lock shell 100 can be aligned with a portion of said tongue receiver slot 202 of said buckle receiver 102. Said slot width 114 and said slot depth 116 can be larger than said tongue width 110 and said tongue depth 112 to allow a portion of said first end 118 to pass into a portion of said lock shell 100. Said release assembly 126 can be configured to selectively release said tongue 104 from said buckle receiver 102 within said lock shell 100. Said lock shell 100 can be configured to prevent release of said tongue 104 from said buckle receiver 102 without use of said release assembly 126. Said second end 120 of said tongue 104 can be configured to attach to said firearm 1500. Said lock shell 100 comprises said top surface 122 comprising said tongue slot 108. Said tongue slot 108 comprises said slot guard 128 which comprises a raised portion of said top surface 122 having said slot width 114, said slot depth 116, and said slot height 124. Said second end 120 of said tongue 104 can be attached to said firearm 1500 with said buttstock anchor 1504. Said gun lock system 106 comprises said buttstock anchor 1504. Said buttstock anchor 1504 comprises said horizontal anchor shaft 1506. Said horizontal anchor shaft 1506 can be configured to inserted through a shaft through a portion of said buttstock end 1502, and said tongue 104 can be held within a portion of said buttstock end 1502 by said horizontal anchor shaft 1506. Said second end 120 of said tongue 104 can be inserted through a lower aperture in said buttstock end 1502, extend up to said horizontal anchor shaft 1506, and a portion of said buttstock anchor 1504 can be inserted through a portion of said second end 120 of said tongue 104. Said gun lock system 106 further comprises said buttstock wrap assembly 1700. Said second end 120 of said tongue 104 can be attached to said firearm 1500 with said buttstock wrap assembly 1700. Said buttstock wrap assembly 1700 comprises said lower cradle 1702, said strap 1704 having said first end 1706 and said second end 1708, said first end bracket 1710, and said second end bracket 1712. Said buttstock wrap assembly 1700 can be configured to wrap around said buttstock end 1502, securely extend said first end 1706 toward said second end 1708 of said buttstock wrap assembly 1700, hold a lower portion of said buttstock end 1502 in said lower cradle 1702, attach said first end bracket 1710 to said second end bracket 1712, and hold said tongue 104 to said buttstock end 1502. Said second end bracket 1712 comprises said receiver slot 1714, and said first end bracket 1710 comprises said receiver extension 1716. Said receiver extension 1716 can be configured to attach to said second end bracket 1712 by sliding said receiver slot 1714 into said receiver extension 1716 and applying pressure along the length of said strap 1704 to pull said receiver slot 1714 and said receiver extension 1716 away from one another.

Said lock shell 100 comprises said top surface 122 comprising said tongue slot 108. Said tongue slot 108 comprises said slot guard 128 which comprises a raised portion of said top surface 122 having said slot width 114, said slot depth 116, and said slot height 124.

Said second end 120 of said tongue 104 can be attached to said firearm 1500 with said buttstock anchor 1504. Said gun lock system 106 comprises said buttstock anchor 1504. Said buttstock anchor 1504 comprises said horizontal anchor shaft 1506. Said horizontal anchor shaft 1506 can be configured to inserted through a shaft through a portion of said buttstock end 1502, and said tongue 104 can be held within a portion of said buttstock end 1502 by said horizontal anchor shaft 1506. Said second end 120 of said tongue 104 can be inserted through a lower aperture in said buttstock end 1502, extend up to said horizontal anchor shaft 1506, and a portion of said buttstock anchor 1504 can be inserted through a portion of said second end 120 of said tongue 104.

Said lock shell 100 further comprises said wrap and drill bracket 1800. Said second end 120 of said tongue 104 can be attached to said firearm 1500 with said wrap and drill bracket 1800. Said wrap and drill bracket 1800 comprises said exterior wrap around ring 1802, said center shaft 1804 and said tongue 104. Said exterior wrap around ring 1802 can be configured to extend around a perimeter of said buttstock end 1502. Said center shaft 1804 can be drilled through a portion of said buttstock end 1502. Said tongue 104 can be configured to attach to said center shaft 1804 of said wrap and drill bracket 1800.

Said gun lock system 106 comprises said ratcheting strap assembly 1900. Said second end 120 of said tongue 104 can be attached to said firearm 1500 with said ratcheting strap assembly 1900. Said ratcheting strap assembly 1900 can be configured to attach said tongue 104 to said buttstock end 1502. Said ratcheting strap assembly 1900 comprises said first end 1902, said second end 1904, said strap portion 1906, said bridge portion 1908, said first axis 1910, said second axis 1912, said threaded shaft 1914, and said nut 1916. Said ratcheting strap assembly 1900 can be configured to attach to said buttstock end 1502 by wrapping said strap portion 1906 around said buttstock end 1502, attaching said first end 1902 to said second end 1904 by screwing said threaded shaft 1914 into a portion of said bridge portion 1908, and tightening said nut 1916 until said strap portion 1906 can be firmly attached to said buttstock end 1502. Said tongue 104 can be attached to a portion of said ratcheting strap assembly 1900.

Said second end 120 of said tongue 104 can be attached to said firearm 1500 with 1502/. said gun lock system 106 further comprises said bolt on assembly 2000. Said bolt on assembly 2000 can be configured to rotatably attach said tongue 104 to said buttstock end 1502. Said bolt on assembly 2000 comprises said screw in bolt assembly 2002, said pivot assembly 2004 and said tongue 104. Said screw in bolt assembly 2002 can be configured to screw into a portion of said buttstock end 1502 and hold said bolt on assembly 2000 to said firearm 1500. Said pivot assembly 2004 can be configured to allow said tongue 104 to rotate relative to said buttstock end 1502.

Said gun lock system 106 can be configured to attach to said extra receiver 1304 rather than said OEM receiver 1302 in a vehicle. Said OEM receiver 1302 and said extra receiver 1304 both comprise said buckle receiver 102. Said extra receiver 1304 can be attached to a portion of a vehicle.

Said extra receiver 1304 can be attached to said vehicle with said bolt 1306.

Said bolt 1306 comprises a tamper proof bolt to prevent removal for purposes of theft.

Said release assembly 126 comprises said lock 318, said button pressing extension 408 and said unlocking mechanism 410. Said lock 318 can be configured to selectively activate or deactivated said unlocking mechanism 410. Said unlocking mechanism 410 can be configured to engage or disengage said button pressing extension 408. Said button pressing extension 408 can be configured to selectively activate said release button 206 of said buckle receiver 102 between said unlocking position 500 and said locking position 600.

Said lock 318 comprises said combination lock 1200 having said one or more combination dials 1202. Said one or more combination dials 1202 can be adjusted so as to release said button pressing extension 408 for action within said cavity 400.

Said release assembly 126 comprises said rotational axis 412. Said button pressing extension 408 can be configured to rotate about said rotational axis 412 so as to rotate said button pressing extension 408 between said unlocking position 500 and said locking position 600.

Said release assembly 126 comprises said drawer lock 1100. Said button pressing extension 408 can be configured to slide up and down within said cavity 400 so as to press and release said button pressing extension 408 between said unlocking position 500 and said locking position 600.

Said gun lock system 106 for securing a portion of said firearm 1500 for safety and theft-deterence. wherein: said gun lock system 106 comprises said tongue 104, said lock shell 100, and said release assembly 126. Said lock shell 100 comprises said width 300, said height 302, said depth 304, said front side 306, said back side 308, said top side 310, said first side 312, said second side 314 and said bottom end 316. Said lock shell 100 further comprises said tongue slot 108 configured to selectively receive a portion of said tongue 104. Said tongue 104 comprises said tongue width 110 and said tongue depth 112. Said tongue slot 108 comprises said slot width 114 and said slot depth 116. Said tongue 104 comprises said first end 118 and said second end 120. Said first end 118 of said tongue 104 can be configured to selectively mate with said buckle receiver 102. Said bottom end 316 of said lock shell 100 comprises said bottom opening 402 exposing said cavity 400 within said lock shell 100. Said buckle receiver 102 comprises said tongue receiver slot 202, said release button 206 and said head portion 212. Said lock shell 100 can be configured to receive a portion of said head portion 212 of said buckle receiver 102. with a portion of said head portion 212 inside of said lock shell 100, said tongue slot 108 of said lock shell 100 can be aligned with a portion of said tongue receiver slot 202 of said buckle receiver 102. Said slot width 114 and said slot depth 116 can be larger than said tongue width 110 and said tongue depth 112 to allow a portion of said first end 118 to pass into a portion of said lock shell 100. Said release assembly 126 can be configured to selectively release said tongue 104 from said buckle receiver 102 within said lock shell 100. Said lock shell 100 can be configured to prevent release of said tongue 104 from said buckle receiver 102 without use of said release assembly 126. Said second end 120 of said tongue 104 can be configured to attach to said firearm 1500. Said lock shell 100 comprises said top surface 122 comprising said tongue slot 108. Said tongue slot 108 comprises said slot guard 128 which comprises a raised portion of said top surface 122 having said slot width 114, said slot depth 116, and said slot height 124. Said release assembly 126 comprises said lock 318, said button pressing extension 408 and said unlocking mechanism 410. Said lock 318 can be configured to selectively activate or deactivated said unlocking mechanism 410. Said unlocking mechanism 410 can be configured to engage or disengage said button pressing extension 408. Said button pressing extension 408 can be configured to selectively activate said release button 206 of said buckle receiver 102 between said unlocking position 500 and said locking position 600.

Said lock 318 comprises said combination lock 1200 having said one or more combination dials 1202, as illustrated and known in the art. Said one or more combination dials 1202 can be adjusted so as to release said button pressing extension 408 for action within said cavity 400.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A gun lock system for securing a portion of a firearm for safety and theft-deterence. wherein:
   said gun lock system comprises a tongue, a lock shell, and a release assembly;
   said lock shell comprises a width, a height, a depth, a front side, a back side, a top side, a first side, a second side and a bottom end;
   said lock shell further comprises a tongue slot configured to selectively receive a portion of said tongue;
   said tongue comprises a tongue width and a tongue depth;
   said tongue slot comprises a slot width and a slot depth;
   said tongue comprises a first end and a second end;
   said first end of said tongue is configured to selectively mate with a buckle receiver;
   said bottom end of said lock shell comprises a bottom opening exposing a cavity within said lock shell;
   said buckle receiver comprises a tongue receiver slot, a release button and a head portion;
   said lock shell is configured to receive a portion of said head portion of said buckle receiver;
   with a portion of said head portion inside of said lock shell, said tongue slot of said lock shell is aligned with a portion of said tongue receiver slot of said buckle receiver;
   said slot width and said slot depth are larger than said tongue width and said tongue depth to allow a portion of said first end to pass into a portion of said lock shell;
   said release assembly is configured to selectively release said tongue from said buckle receiver within said lock shell;
   said lock shell is configured to prevent release of said tongue from said buckle receiver without use of said release assembly;
   said second end of said tongue is configured to attach to said firearm;
   Said lock shell 100 comprises a top surface comprising said tongue slot;
   said tongue slot comprises a slot guard which comprises a raised portion of said top surface having said slot width, said slot depth, and a slot height;
   said second end of said tongue is attached to said firearm with a buttstock anchor;
   said gun lock system comprises said buttstock anchor;
   said buttstock anchor comprises a horizontal anchor shaft;
   wherein, said horizontal anchor shaft is configured to inserted through a shaft through a portion of a buttstock end, and said tongue is held within a portion of said buttstock end by said horizontal anchor shaft;
   said second end of said tongue is inserted through a lower aperture in said buttstock end, extend up to said horizontal anchor shaft, and a portion of said buttstock anchor is inserted through a portion of said second end of said tongue;

said gun lock system further comprises a buttstock wrap assembly;

said second end of said tongue is attached to said firearm with said buttstock wrap assembly;

said buttstock wrap assembly comprises lower cradle, strap having a first end and a second end, a first end bracket, and a second end bracket;

said buttstock wrap assembly is configured to
wrap around said buttstock end,
securely extend said first end toward said second end of said buttstock wrap assembly,
hold a lower portion of said buttstock end in said lower cradle,
attach said first end bracket to said second end bracket, and
hold said tongue to said buttstock end;

said second end bracket comprises a receiver slot, and said first end bracket comprises a receiver extension;

said receiver extension is configured to attach to said second end bracket by
sliding said receiver slot into said receiver extension and
applying pressure along the length of said strap to pull said receiver slot and said receiver extension away from one another.

2. A gun lock system for securing a portion of a firearm for safety and theft-deterence. wherein:

said gun lock system comprises a tongue, a lock shell, and a release assembly;

said lock shell comprises a width, a height, a depth, a front side, a back side, a top side, a first side, a second side and a bottom end;

said lock shell further comprises a tongue slot configured to selectively receive a portion of said tongue;

said tongue comprises a tongue width and a tongue depth;

said tongue slot comprises a slot width and a slot depth;

said tongue comprises a first end and a second end;

said first end of said tongue is configured to selectively mate with a buckle receiver;

said bottom end of said lock shell comprises a bottom opening exposing a cavity within said lock shell;

said buckle receiver comprises a tongue receiver slot, a release button and a head portion;

said lock shell is configured to receive a portion of said head portion of said buckle receiver;

with a portion of said head portion inside of said lock shell, said tongue slot of said lock shell is aligned with a portion of said tongue receiver slot of said buckle receiver;

said slot width and said slot depth are larger than said tongue width and said tongue depth to allow a portion of said first end to pass into a portion of said lock shell;

said first end of said tongue is configured to substantially fills said tongue slot when inserted into said lock shell;

said release assembly is configured to selectively release said tongue from said buckle receiver within said lock shell;

said lock shell is configured to prevent release of said tongue from said buckle receiver without use of said release assembly; and said second end of said tongue is configured to attach to said firearm.

3. The gun lock system of claim 2, wherein:
said lock shell comprises a top surface comprising said tongue slot; and
said tongue slot comprises a slot guard which comprises a raised portion of said top surface having said slot width, said slot depth, and a slot height.

4. The gun lock system of claim 3, wherein:
said second end of said tongue is attached to said firearm with a buttstock anchor;
said gun lock system comprises said buttstock anchor;
said buttstock anchor comprises a horizontal anchor shaft; and wherein, said horizontal anchor shaft is configured to inserted through a shaft through a portion of a buttstock end, and said tongue is held within a portion of said buttstock end by said horizontal anchor shaft; and
said second end of said tongue is inserted through a lower aperture in said buttstock end, extend up to said horizontal anchor shaft, and a portion of said buttstock anchor is inserted through a portion of said second end of said tongue.

5. The gun lock system of claim 3, wherein:
said gun lock system further comprise a tongue bolting bracket;
said second end of said tongue is attached to said firearm with said tongue bolting bracket;
said tongue bolting bracket is attached to a portion of said firearm, such as said buttstock end, and said tongue is attached to said tongue bolting bracket;
For example, said tongue is attached to a portion of said tongue bolting bracket with a threaded shaft, welding, or similar; and
said tongue bolting bracket comprises a pivoting receiver extension configured to allow said tongue to rotate about said tongue bolting bracket.

6. The gun lock system of claim 3, wherein:
said gun lock system further comprises a buttstock wrap assembly;
said second end of said tongue is attached to said firearm with said buttstock wrap assembly;
said buttstock wrap assembly comprises lower cradle, strap having a first end and a second end, a first end bracket, and a second end bracket;
said buttstock wrap assembly is configured to
wrap around said buttstock end,
securely extend said first end toward said second end of said buttstock wrap assembly,
hold a lower portion of said buttstock end in said lower cradle,
attach said first end bracket to said second end bracket,
twisting said tongue through a portion of said strap and tightening nut to tighten said lower cradle into said buttstock end, and
hold said tongue to said buttstock end;
said second end bracket comprises a receiver slot, and said first end bracket comprises a receiver extension;
said receiver extension is configured to attach to said second end bracket by
sliding said receiver slot into said receiver extension and
applying pressure along the length of said strap to pull said receiver slot and said receiver extension away from one another.

7. The gun lock system of claim 3, wherein:
said strap comprises a rubber coated flat cable.

8. The gun lock system of claim 3, wherein:
said lock shell further comprises a wrap and drill bracket;
said second end of said tongue is attached to said firearm with said wrap and drill bracket;
said wrap and drill bracket comprises an exterior wrap around ring, a center shaft and said tongue;
said exterior wrap around ring is configured to extend around a perimeter of said buttstock end;
said center shaft is drilled through a portion of said buttstock end; and
said tongue is configured to attach to said center shaft of said wrap and drill bracket.

9. The gun lock system of claim 3, wherein:
said gun lock system comprises a ratcheting strap assembly;
said second end of said tongue is attached to said firearm with said ratcheting strap assembly;
said ratcheting strap assembly is configured to attach said tongue to said buttstock end;
said ratcheting strap assembly comprises a first end, a second end, a strap portion, a bridge portion, a first axis, a second axis, a threaded shaft, and a nut;
said ratcheting strap assembly is configured to attach to said buttstock end by
wrapping said strap portion around said buttstock end,
attaching said first end to said second end by screwing said threaded shaft into a portion of said bridge portion, and
tightening said nut until said strap portion is firmly attached to said buttstock end; and
said tongue is attached to a portion of said ratcheting strap assembly.

10. The gun lock system of claim 3, wherein:
said second end of said tongue is attached to said firearm with 1502/;
said gun lock system further comprises a bolt on assembly;
said bolt on assembly is configured to rotatably attach said tongue to said buttstock end;
said bolt on assembly comprises a screw in bolt assembly, a pivot assembly and said tongue;
said screw in bolt assembly is configured to screw into a portion of said buttstock end and hold said bolt on assembly to said firearm; and
said pivot assembly is configured to allow said tongue to rotate relative to said buttstock end.

11. The gun lock system of claim 2, wherein:
said gun lock system is configured to attach to an extra receiver rather than an OEM receiver in a vehicle;
said OEM receiver and said extra receiver both comprise said buckle receiver; and
said extra receiver is attached to a portion of a vehicle.

12. The gun lock system of claim 11, wherein:
said extra receiver is attached to said vehicle with a bolt.

13. The gun lock system of claim 12, wherein:
said bolt comprises a tamper proof bolt to prevent removal for purposes of theft.

14. The gun lock system of claim 2, wherein:
said release assembly comprises a lock, a button pressing extension and an unlocking mechanism;
said lock is configured to selectively activate or deactivated said unlocking mechanism;
said unlocking mechanism is configured to engage or disengage said button pressing extension; and
said button pressing extension is configured to selectively activate said release button of said buckle receiver between unlocking position and locking position.

15. The gun lock system of claim 14, wherein:
said lock comprises a combination lock having one or more combination dials; and
said one or more combination dials is adjusted so as to release said button pressing extension for action within said cavity.

16. The gun lock system of claim 15, wherein:
said lock comprises a keyed lock; and
said keyed lock is configured to receive a key into said unlocking mechanism, whereupon turning said key causes said button pressing extension to turn within said cavity.

17. The gun lock system of claim 14, wherein:
said release assembly comprises a rotational axis; and
said button pressing extension is configured to rotate about said rotational axis so as to rotate said button pressing extension between said unlocking position and said locking position.

18. The gun lock system of claim 14, wherein:
said release assembly comprises a drawer lock. wherein, said button pressing extension is configured to slide up and down within said cavity so as to press and release said button pressing extension between said unlocking position and said locking position.

19. A gun lock system for securing a portion of a firearm for safety and theft-deterence. wherein:
said gun lock system comprises a tongue, a lock shell, and a release assembly;
said lock shell comprises a width, a height, a depth, a front side, a back side, a top side, a first side, a second side and a bottom end;
said lock shell further comprises a tongue slot configured to selectively receive a portion of said tongue;
said tongue comprises a tongue width and a tongue depth;
said tongue slot comprises a slot width and a slot depth;
said tongue comprises a first end and a second end;
said first end of said tongue is configured to selectively mate with a buckle receiver;
said bottom end of said lock shell comprises a bottom opening exposing a cavity within said lock shell;
said buckle receiver comprises a tongue receiver slot, a release button and a head portion;
said lock shell is configured to receive a portion of said head portion of said buckle receiver;
with a portion of said head portion inside of said lock shell, said tongue slot of said lock shell is aligned with a portion of said tongue receiver slot of said buckle receiver;
said slot width and said slot depth are larger than said tongue width and said tongue depth to allow a portion of said first end to pass into a portion of said lock shell;
said release assembly is configured to selectively release said tongue from said buckle receiver within said lock shell;
said lock shell is configured to prevent release of said tongue from said buckle receiver without use of said release assembly;
said second end of said tongue is configured to attach to said firearm;
said lock shell comprises a top surface comprising said tongue slot;
said tongue slot comprises a slot guard which comprises a raised portion of said top surface having said slot width, said slot depth, and a slot height;
said release assembly comprises a lock, a button pressing extension and an unlocking mechanism;

said lock is configured to selectively activate or deactivated said unlocking mechanism;

said unlocking mechanism is configured to engage or disengage said button pressing extension; and said button pressing extension is configured to selectively activate said release button of said buckle receiver between unlocking position and locking position.

20. The gun lock system of claim 19, wherein:

said lock comprises a combination lock having one or more combination dials; and said one or more combination dials is adjusted so as to release said button pressing extension for action within said cavity.

\* \* \* \* \*